US011704685B2

(12) United States Patent
Najmi

(10) Patent No.: US 11,704,685 B2
(45) Date of Patent: *Jul. 18, 2023

(54) FRAMEWORK FOR IMPLEMENTING SEGMENTED DIMENSIONS

(71) Applicant: Blue Yonder Group, Inc., Scottsdale, AZ (US)

(72) Inventor: Adeel Najmi, Plano, TX (US)

(73) Assignee: Blue Yonder Group, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/866,087

(22) Filed: Jul. 15, 2022

(65) Prior Publication Data
US 2022/0351222 A1 Nov. 3, 2022

Related U.S. Application Data

(63) Continuation of application No. 14/216,477, filed on Mar. 17, 2014, now Pat. No. 11,397,957.

(60) Provisional application No. 61/800,298, filed on Mar. 15, 2013.

(51) Int. Cl.
*G06Q 30/0204* (2023.01)
*G06Q 10/0637* (2023.01)
*G06Q 10/0639* (2023.01)

(52) U.S. Cl.
CPC ..... *G06Q 30/0204* (2013.01); *G06Q 10/0637* (2013.01); *G06Q 10/06393* (2013.01)

(58) Field of Classification Search
CPC ........... G06Q 30/0204; G06Q 10/0637; G06Q 10/06393
See application file for complete search history.

(56) References Cited

U.S. PATENT DOCUMENTS

| | | | |
|---|---|---|---|
| 7,233,952 B1* | 6/2007 | Chen | G06Q 10/06 |
| 2002/0087540 A1* | 7/2002 | Ashida | G06F 16/21 |
| 2002/0123930 A1 | 9/2002 | Boyd et al. | |
| 2002/0161764 A1 | 10/2002 | Sharo | |
| 2003/0101449 A1 | 5/2003 | Bentolila et al. | |
| 2004/0098358 A1 | 5/2004 | Roediger | |
| 2004/0103051 A1 | 5/2004 | Reed et al. | |
| 2004/0162771 A1* | 8/2004 | Tamatsu | G06Q 30/02 705/30 |
| 2005/0033630 A1 | 2/2005 | Kowalchuk | |
| 2005/0071223 A1 | 3/2005 | Jain et al. | |
| 2006/0116927 A1 | 6/2006 | Miller et al. | |
| 2007/0112614 A1* | 5/2007 | Maga | G06Q 30/02 705/7.33 |
| 2008/0133567 A1* | 6/2008 | Ames | G06F 16/358 707/999.102 |

(Continued)

OTHER PUBLICATIONS

Lemon, Katherine and Mark, Tanya, "Customer Lifetime Value s the Basis of Customer Segmentation:Issues and Challenges," The Haworth Press, Inc, 2006.*

*Primary Examiner* — Renae Feacher
(74) *Attorney, Agent, or Firm* — Spencer Fane LLP; Steven J. Laureanti

(57) ABSTRACT

A system and method are disclosed for segmentation planning wherein a cost-to-serve interval and a value interval are used to generate a strategy for a micro-segment defined along a portion of the cost-to-serve interval and value interval, and similar micro-segments may be assigned to a single persona based on similar cost-to-serve and value tradeoffs.

20 Claims, 23 Drawing Sheets

(56) References Cited

U.S. PATENT DOCUMENTS

| | | | |
|---|---|---|---|
| 2008/0133681 A1* | 6/2008 | Jackson | G06F 11/2294 |
| | | | 709/204 |
| 2008/0262925 A1 | 10/2008 | Kim et al. | |
| 2008/0270363 A1* | 10/2008 | Hunt | G06F 16/2462 |
| 2010/0106568 A1 | 4/2010 | Grimes | |
| 2010/0125872 A1 | 5/2010 | Crow et al. | |
| 2011/0184813 A1 | 7/2011 | Barnes et al. | |
| 2012/0066065 A1* | 3/2012 | Switzer | G06Q 30/0255 |
| | | | 705/1.1 |
| 2012/0259679 A1 | 10/2012 | Barney | |
| 2013/0117037 A1* | 5/2013 | Eichert, Jr. | G06Q 30/0204 |
| | | | 705/7.33 |
| 2014/0172506 A1* | 6/2014 | Parsell | G06Q 30/0204 |
| | | | 705/7.33 |

* cited by examiner

| Micro-Segment Grid | | | Male | | | | Female | | | |
|---|---|---|---|---|---|---|---|---|---|---|
| Geo Sector | Income | Education / Age | None | Basic | High School | University | None | Basic | High School | University |
| Rural | Low Income | Youth | 0.045 | 0.134 | 0.134 | 0.134 | 0.041 | 0.123 | 0.123 | 0.123 |
| | | Young | 0.056 | 0.167 | 0.167 | 0.167 | 0.051 | 0.154 | 0.154 | 0.154 |
| | | Mature | 0.078 | 0.234 | 0.234 | 0.234 | 0.072 | 0.216 | 0.216 | 0.216 |
| | | Aged | 0.045 | 0.134 | 0.134 | 0.134 | 0.041 | 0.123 | 0.123 | 0.123 |
| | Middle Income | Youth | 0.053 | 0.159 | 0.159 | 0.159 | 0.049 | 0.147 | 0.147 | 0.147 |
| | | Young | 0.066 | 0.199 | 0.199 | 0.199 | 0.061 | 0.184 | 0.184 | 0.184 |
| | | Mature | 0.093 | 0.278 | 0.278 | 0.278 | 0.086 | 0.257 | 0.257 | 0.257 |
| | | Aged | 0.053 | 0.159 | 0.159 | 0.159 | 0.049 | 0.147 | 0.147 | 0.147 |
| | High Income | Youth | 0.008 | 0.025 | 0.025 | 0.025 | 0.008 | 0.024 | 0.024 | 0.024 |
| | | Young | 0.011 | 0.032 | 0.032 | 0.032 | 0.010 | 0.029 | 0.029 | 0.029 |
| | | Mature | 0.015 | 0.045 | 0.045 | 0.045 | 0.014 | 0.041 | 0.041 | 0.041 |
| | | Aged | 0.008 | 0.025 | 0.025 | 0.025 | 0.008 | 0.024 | 0.024 | 0.024 |
| Urban | Low Income | Youth | 0.030 | 0.089 | 0.089 | 0.089 | 0.027 | 0.082 | 0.082 | 0.082 |
| | | Young | 0.037 | 0.111 | 0.111 | 0.111 | 0.034 | 0.103 | 0.103 | 0.103 |
| | | Mature | 0.052 | 0.156 | 0.156 | 0.156 | 0.048 | 0.144 | 0.144 | 0.144 |
| | | Aged | 0.030 | 0.089 | 0.089 | 0.089 | 0.027 | 0.082 | 0.082 | 0.082 |
| | Middle Income | Youth | 0.035 | 0.106 | 0.106 | 0.106 | 0.033 | 0.098 | 0.098 | 0.098 |
| | | Young | 0.044 | 0.133 | 0.133 | 0.133 | 0.041 | 0.122 | 0.122 | 0.122 |
| | | Mature | 0.062 | 0.186 | 0.186 | 0.186 | 0.057 | 0.171 | 0.171 | 0.171 |
| | | Aged | 0.035 | 0.106 | 0.106 | 0.106 | 0.033 | 0.098 | 0.098 | 0.098 |
| | High Income | Youth | 0.006 | 0.017 | 0.017 | 0.017 | 0.005 | 0.016 | 0.016 | 0.016 |
| | | Young | 0.007 | 0.021 | 0.021 | 0.021 | 0.007 | 0.020 | 0.020 | 0.020 |
| | | Mature | 0.010 | 0.030 | 0.030 | 0.030 | 0.009 | 0.027 | 0.027 | 0.027 |
| | | Aged | 0.006 | 0.017 | 0.017 | 0.017 | 0.005 | 0.016 | 0.016 | 0.016 |

FIG. 5G-2

| Micro-Segment Grid | | | | Male | | | | Female | | | |
|---|---|---|---|---|---|---|---|---|---|---|---|
| Geo Sector | Income | Education | Age | None | Basic | High School | University | None | Basic | High School | University |
| Rural | Low Income | | Youth | 0.045 | 0.134 | 0.134 | 0.134 | 0.041 | 0.123 | 0.123 | 0.123 |
| | | | Young | 0.056 | 0.167 | 0.167 | 0.167 | 0.051 | 0.154 | 0.154 | 0.154 |
| | | | Mature | 0.078 | 0.234 | 0.234 | 0.234 | 0.072 | 0.216 | 0.216 | 0.216 |
| | | | Aged | 0.045 | 0.134 | 0.134 | 0.134 | 0.041 | 0.123 | 0.123 | 0.123 |
| | Middle Income | | Youth | 0.053 | 0.159 | 0.159 | 0.159 | 0.049 | 0.147 | 0.147 | 0.147 |
| | | | Young | 0.066 | 0.199 | 0.199 | 0.199 | 0.061 | 0.184 | 0.184 | 0.184 |
| | | | Mature | 0.093 | 0.278 | 0.278 | 0.278 | 0.086 | 0.257 | 0.257 | 0.257 |
| | | | Aged | 0.053 | 0.159 | 0.159 | 0.159 | 0.049 | 0.147 | 0.147 | 0.147 |
| | High Income | | Youth | 0.008 | 0.025 | 0.025 | 0.025 | 0.008 | 0.024 | 0.024 | 0.024 |
| | | | Young | 0.011 | 0.032 | 0.032 | 0.032 | 0.010 | 0.029 | 0.029 | 0.029 |
| | | | Mature | 0.015 | 0.045 | 0.045 | 0.045 | 0.014 | 0.041 | 0.041 | 0.041 |
| | | | Aged | 0.008 | 0.025 | 0.025 | 0.025 | 0.008 | 0.024 | 0.024 | 0.024 |
| Urban | Low Income | | Youth | 0.030 | 0.089 | 0.089 | 0.089 | 0.027 | 0.082 | 0.082 | 0.082 |
| | | | Young | 0.037 | 0.111 | 0.111 | 0.111 | 0.034 | 0.103 | 0.103 | 0.103 |
| | | | Mature | 0.052 | 0.156 | 0.156 | 0.156 | 0.048 | 0.144 | 0.144 | 0.144 |
| | | | Aged | 0.030 | 0.089 | 0.089 | 0.089 | 0.027 | 0.082 | 0.082 | 0.082 |
| | Middle Income | | Youth | 0.035 | 0.106 | 0.106 | 0.106 | 0.033 | 0.098 | 0.098 | 0.098 |
| | | | Young | 0.044 | 0.133 | 0.133 | 0.133 | 0.041 | 0.122 | 0.122 | 0.122 |
| | | | Mature | 0.062 | 0.186 | 0.186 | 0.186 | 0.057 | 0.171 | 0.171 | 0.171 |
| | | | Aged | 0.035 | 0.106 | 0.106 | 0.106 | 0.033 | 0.098 | 0.098 | 0.098 |
| | High Income | | Youth | 0.006 | 0.017 | 0.017 | 0.017 | 0.005 | 0.016 | 0.016 | 0.016 |
| | | | Young | 0.007 | 0.021 | 0.021 | 0.021 | 0.007 | 0.020 | 0.020 | 0.020 |
| | | | Mature | 0.010 | 0.030 | 0.030 | 0.030 | 0.009 | 0.027 | 0.027 | 0.027 |
| | | | Aged | 0.006 | 0.017 | 0.017 | 0.017 | 0.005 | 0.016 | 0.016 | 0.016 |

FIG. 5H-2

Micro-Segment Grid

| Geo Sector | Income | Education | Age | Male | | | | Female | | | |
|---|---|---|---|---|---|---|---|---|---|---|---|
| | | | | None | Basic | High School | University | None | Basic | High School | University |
| Rural | Low Income | | Youth | 0.045 | 0.134 | 0.134 | 0.134 | 0.041 | 0.123 | 0.123 | 0.123 |
| | | | Young | 0.056 | 0.167 | 0.167 | 0.167 | 0.051 | 0.154 | 0.154 | 0.154 |
| | | | Mature | 0.078 | 0.234 | 0.234 | 0.234 | 0.072 | 0.216 | 0.216 | 0.216 |
| | | | Aged | 0.045 | 0.134 | 0.134 | 0.134 | 0.041 | 0.123 | 0.123 | 0.123 |
| | Middle Income | | Youth | 0.053 | 0.159 | 0.159 | 0.159 | 0.049 | 0.147 | 0.147 | 0.147 |
| | | | Young | 0.066 | 0.199 | 0.199 | 0.199 | 0.061 | 0.184 | 0.184 | 0.184 |
| | | | Mature | 0.093 | 0.278 | 0.278 | 0.278 | 0.086 | 0.257 | 0.257 | 0.257 |
| | | | Aged | 0.053 | 0.159 | 0.159 | 0.159 | 0.049 | 0.147 | 0.147 | 0.147 |
| | High Income | | Youth | 0.008 | 0.025 | 0.025 | 0.025 | 0.008 | 0.024 | 0.024 | 0.024 |
| | | | Young | 0.011 | 0.032 | 0.032 | 0.032 | 0.010 | 0.029 | 0.029 | 0.029 |
| | | | Mature | 0.015 | 0.045 | 0.045 | 0.045 | 0.014 | 0.041 | 0.041 | 0.041 |
| | | | Aged | 0.008 | 0.025 | 0.025 | 0.025 | 0.008 | 0.024 | 0.024 | 0.024 |
| Urban | Low Income | | Youth | 0.030 | 0.089 | 0.089 | 0.089 | 0.027 | 0.082 | 0.082 | 0.082 |
| | | | Young | 0.037 | 0.111 | 0.111 | 0.111 | 0.034 | 0.103 | 0.103 | 0.103 |
| | | | Mature | 0.052 | 0.156 | 0.156 | 0.156 | 0.048 | 0.144 | 0.144 | 0.144 |
| | | | Aged | 0.030 | 0.089 | 0.089 | 0.089 | 0.027 | 0.082 | 0.082 | 0.082 |
| | Middle Income | | Youth | 0.035 | 0.106 | 0.106 | 0.106 | 0.033 | 0.098 | 0.098 | 0.098 |
| | | | Young | 0.044 | 0.133 | 0.133 | 0.133 | 0.041 | 0.122 | 0.122 | 0.122 |
| | | | Mature | 0.062 | 0.186 | 0.186 | 0.186 | 0.057 | 0.171 | 0.171 | 0.171 |
| | | | Aged | 0.035 | 0.106 | 0.106 | 0.106 | 0.033 | 0.098 | 0.098 | 0.098 |
| | High Income | | Youth | 0.006 | 0.017 | 0.017 | 0.017 | 0.005 | 0.016 | 0.016 | 0.016 |
| | | | Young | 0.007 | 0.021 | 0.021 | 0.021 | 0.007 | 0.020 | 0.020 | 0.020 |
| | | | Mature | 0.010 | 0.030 | 0.030 | 0.030 | 0.009 | 0.027 | 0.027 | 0.027 |
| | | | Aged | 0.006 | 0.017 | 0.017 | 0.017 | 0.005 | 0.016 | 0.016 | 0.016 |

FRAMEWORK FOR IMPLEMENTING SEGMENTED DIMENSIONS

CROSS-REFERENCE TO RELATED APPLICATIONS

This application is a continuation of U.S. patent application Ser. No. 14/216,477, filed on Mar. 17, 2014, entitled "Framework for Implementing Segmented Dimensions," which claims the benefit under 35 U.S.C. § 119(e) to U.S. Provisional Application No. 61/800,298, filed Mar. 15, 2013, and entitled "A Framework for Implementing Segmented Dimensions." U.S. patent application Ser. No. 14/216,477 and U.S. Provisional Application No. 61/800,298 are assigned to the assignee of the present application.

TECHNICAL FIELD

The disclosure relates generally to a scalable and flexible framework of planning, sourcing, making, delivering, pricing, and sorting across a portfolio of businesses and specifically to the field of implementing a framework of segmented strategies and tactics.

BACKGROUND

Businesses often face an overwhelming amount of information about products and customers. A business owner may attempt to create products to match the needs of certain customers. However, it is difficult to know exactly what types of customers and products match well together. Further compounding this problem is how to target particular customers or products with various strategies and knowing the cost or value of such strategies. This inability to flexibly target various customers and products while at the same time using data to automate routine planning and strategy updating based on data developed from implementing a plan is undesirable.

SUMMARY

A system of segmentation planning is disclosed. The system includes a computer system including a processor, a memory, a database including values stored therein of one or more cost-to-serve intervals and one or more value intervals associated with one or more entities, and a segmentation planner tangibly embodied on a non-transitory computer readable medium. The segmentation planner defines a first dimension and a second dimension of the one or more entities, profiles the one or more entities according to the one or more cost-to-serve intervals and the one or more value intervals and segments the first dimension and the second dimension for the one or more entities based on the one or more cost-to-serve intervals and the one or more value intervals. The segmentation planner also defines one or more micro-segments each comprising a segment of the first dimension and a segment of the second dimension and assigns one or more strategies to the one or more micro-segments based on the cost-to-serve and the value of entities in the one or more micro-segments.

A method of segmentation planning is disclosed. The method includes receiving values stored in a database of one or more cost-to-serve intervals and one or more value intervals associated with one or more entities, defining a first dimension and a second dimension for the one or more entities and profiling, by the computer, the one or more entities according to the one or more cost-to-serve intervals and the one or more value intervals. The method further includes segmenting the first dimension and the second dimension for the one or more entities based on the one or more cost-to-serve intervals and the one or more value intervals, defining one or more micro-segments each comprising a segment of the first dimension and a segment of the second dimension and assigning one or more strategies to the one or more micro-segments based on the cost-to-serve and the value of entities in the one or more micro-segments.

A non-transitory computer-readable medium embodied with software for segmentation planning of one or more entities in a supply chain, each of the one or more entities associated with one or more cost-to-serve intervals and one or more value intervals, the software when executed using one or more computers defines a first dimension and a second dimension for the one or more entities. The software when executed using one or more computers further profiles the one or more entities according to the one or more cost-to-serve intervals and the one or more value intervals and segments the first dimension and the second dimension for the one or more entities based on the one or more cost-to-serve intervals and the one or more value intervals. The software when executed using one or more computers still further defines one or more micro-segments each comprising a segment of the first dimension and a segment of the second dimension and assigns one or more strategies to the one or more micro-segments based on the cost-to-serve and the value of entities in the one or more micro-segments.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 10 illustrates adjustable parameter settings according to an embodiment.

DETAILED DESCRIPTION

Figure 1:
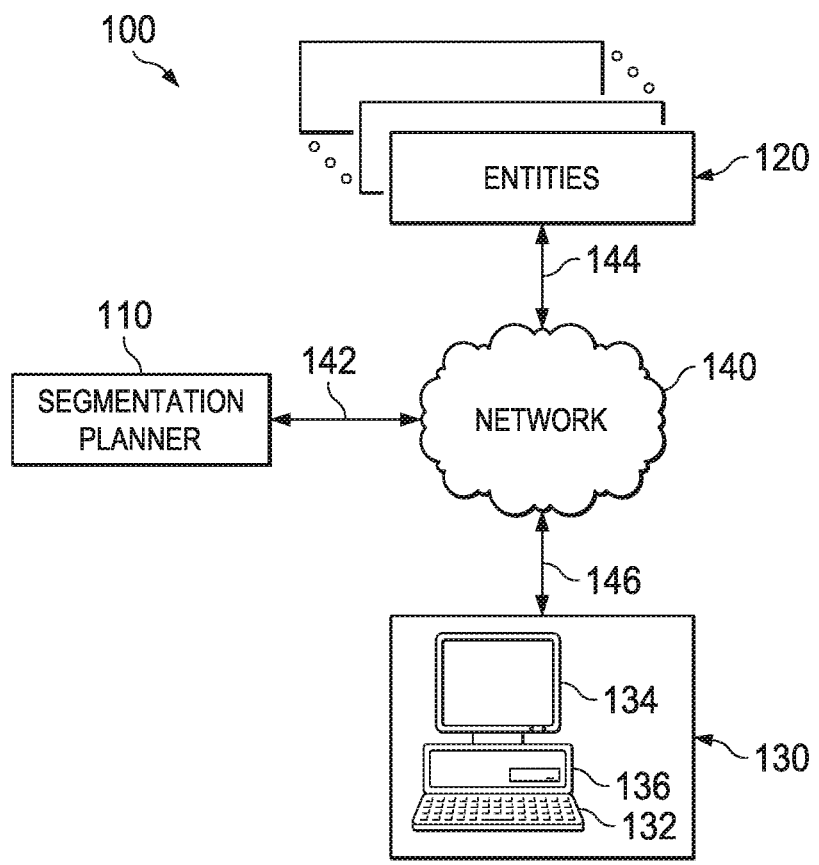
FIG. 1 illustrates an exemplary system according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

According to embodiments, this disclosure relates to systems and methods that involve a framework for implementing segmented planning.

FIG. 1 illustrates an exemplary system 100 according to a preferred embodiment. System 100 comprises segmentation planner 110, one or more entities 120, computers 130, network 140, and communication links 142, 144, and 146. Although a single segmentation planner 110, one or more entities 120, a single computer 130, and a single network 140, are shown and described; embodiments contemplate any number of segmentation planners 110, any number of entities 120, any number of computers 130, or any number of networks 140, according to particular needs.

System 100 may operate on one or more computers 130 that are integral to or separate from the hardware and/or software that support segmentation planner 110 and one or more entities 120. Computers 130 may include any suitable input device 132, such as a keypad, mouse, touch screen, microphone, or other device to input information. An output device 134 may convey information associated with the operation of system 100, including digital or analog data, visual information, or audio information. Computers 130 may include fixed or removable computer-readable storage media, including a non-transitory computer readable medium, magnetic computer disks, flash drives, CD-ROM, in-memory device or other suitable media to receive output from and provide input to system 100. Computers 130 may include one or more processors 136 and associated memory to execute instructions and manipulate information according to the operation of system 100.

Although a single computer 130 is shown in FIG. 1, segmentation planner 110 and one or more entities 120 may each operate on separate computers 130 or may operate on one or more shared computers 130. Each of the one or more computers 130 may be a work station, personal computer (PC), network computer, notebook computer, tablet, personal digital assistant (PDA), cell phone, telephone, wireless data port, or any other suitable computing device. In an embodiment, one or more users may be associated with segmentation planner 110. These one or more users may include, for example, a "planner" handling segmentation and/or one or more related tasks within system 100. In addition, or as an alternative, these one or more users within system 100 may include, for example, one or more computers programmed to autonomously handle, among other things, setting parameters 470$a$-$n$ based on tactics 440 (see FIG. 4) and/or one or more related tasks within system 100. Additionally, "user" or "planner" may refer to a person performing this task interactively or a machine or algorithm performing this task, with or without manual interaction.

In one embodiment, segmentation planner 110 is coupled with network 140 using communications link 142, which may be any wireline, wireless, or other link suitable to support data communications between segmentation planner 110 and network 140 during operation of system 100. One or more entities 120 are coupled with network 140 using communications link 144, which may be any wireline, wireless, or other link suitable to support data communications between one or more entities 120 and network 140 during operation of system 100. Computers 130 are coupled with network 140 using communications link 146, which may be any wireline, wireless, or other link suitable to support data communications between computers 130 and network 140 during operation of system 100.

According to one embodiment, entities 120 are internal or external to a supply chain. Typically, a supply chain receives supplies from one or more suppliers and provides products to one or more customers. A supply chain may include any suitable number of nodes and any suitable number of arcs between the nodes, configured in any suitable manner. The supply chain may have entities 120 such as customers, items, locations, channels, buyers, or any other entity. Items may comprise, for example, products, parts, or supplies that may be used to generate products. An item may comprise a part of the product, or an item may comprise a supply that is used to manufacture the product, but does not become a part of the product, for example, a tool, energy, or resource. The nodes of a supply chain may comprise, for example, locations where items are processed or where products are provided to a customer.

Although communication links 142, 144, and 146 are shown as generally coupling segmentation planner 110, one or more entities 120, and computers 130 with network 140, segmentation planner 110, one or more entities 120, and computers 130 may communicate directly with segmentation planner 110, one or more entities 120, and/or computers 130, according to particular needs.

In another embodiment, network 140 includes the Internet and any appropriate local area networks (LANs), metropolitan area networks (MANs), or wide area networks (WANs) coupling segmentation planner 110, one or more entities 120, and computers 130. For example, data may be maintained by segmentation planner 110 at one or more locations external to segmentation planner 110 and one or more entities 120 and made available to one or more associated users of one or more entities 120 using network 140 or in any other appropriate manner. Those skilled in the art will recognize that the complete structure and operation of communication network 140 and other components within system 100 are not depicted or described. Embodiments may be employed in conjunction with known communications networks 140 and other components.

Figure 2:
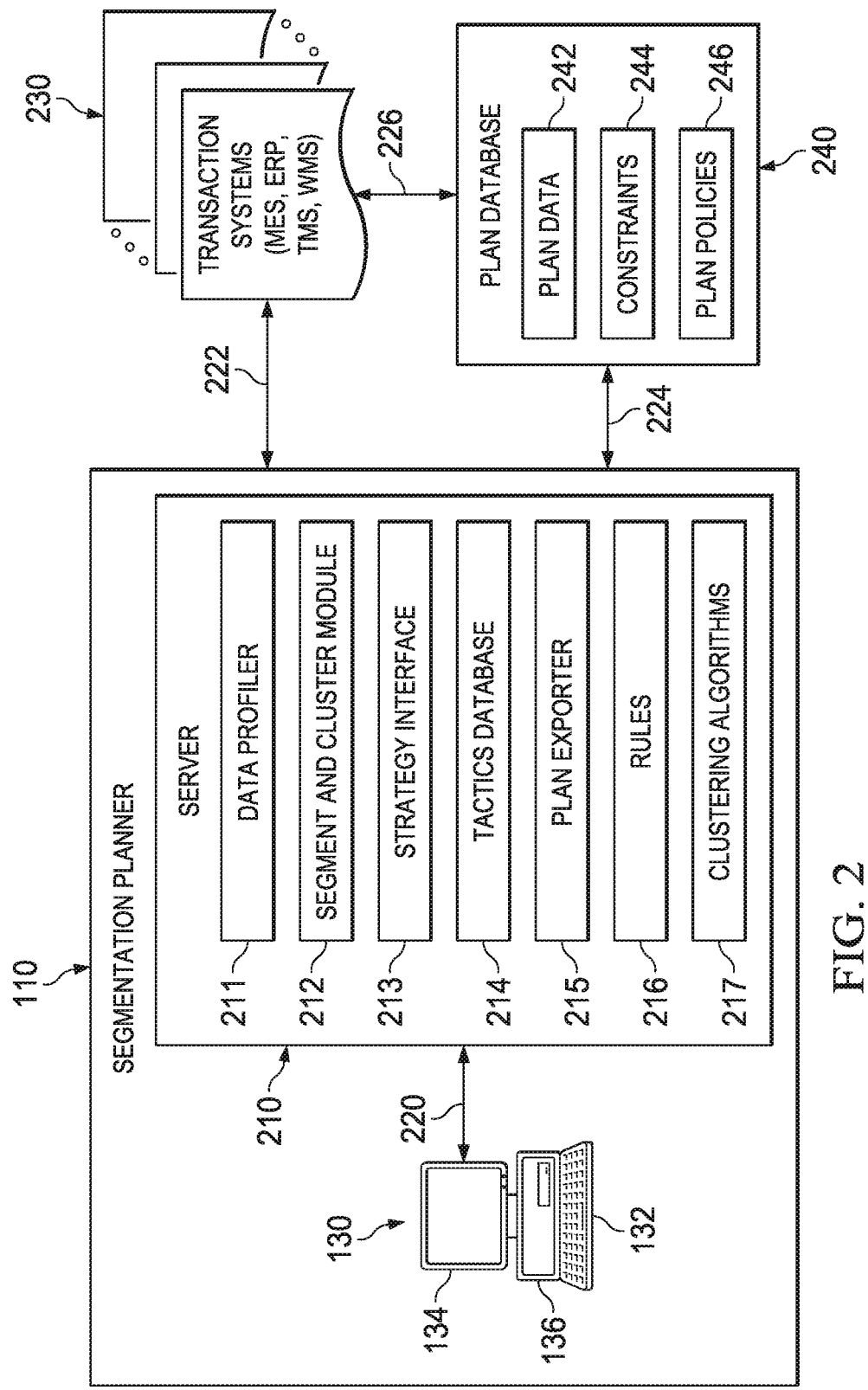
FIG. 2 illustrates an block diagram of segmentation planner according to an embodiment.

FIG. 2 illustrates a detailed view of an embodiment of segmentation planner 110 coupled to transaction systems 230 and plan database 240. As illustrated, segmentation planner comprises server 210 coupled by network connection 220 to computer 130 comprising input device 132, output device 134 and one or more processors 136 and associated memory to execute instructions and manipulate information according to the operation of system 100. Although the depiction in FIG. 2 has computer 130 internal to segmentation planner 110, as discussed above, computer 130 may be externally coupled to segmentation planner 110 by any wireless or wireline connection.

According to an embodiment, server 210 comprises a plurality of modules: data profiler 211, segment and cluster module 212, strategy interface 213, tactics database 214, plan exporter 215, rules 216 and clustering algorithms 217. Although various modules are shown and described on a single server 210, each module or portion thereof may be present on one or more servers 210 coupled by any wireless or wireline connection.

According to an embodiment, data profiler 211 receives entity data from entities 120, computer 130, transaction systems 230, and/or plan database 240. A planner may modify entity data prior to sending entity data to data profiler 211 or may edit the entity data directly therein. Data profiler 211 sorts and categorizes entity data as explained in more detail in FIG. 3. In addition, the operation of segment and cluster module 212, strategy interface 213, tactics database 214, plan exporter 215, rules 216 and clustering algorithms 217 will be explained in more detail in FIG. 3.

Figure 3:
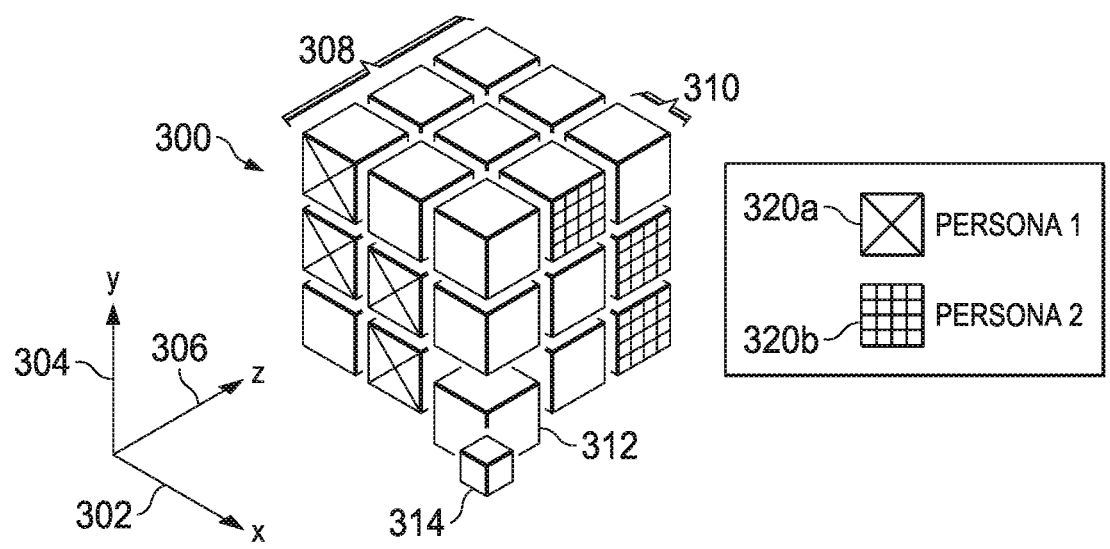
FIG. 3 illustrates a multi-dimensional cube according to an embodiment.

FIG. 3 illustrates a diagram of multi-dimensional cube 300 representing segmentation of entity data. Multi-dimensional cube 300 comprises dimensions 308, segments 310, micro-segments 312, and micro-micro-segments 314, each comprising an x-axis 302, y-axis 304, and z-axis 306.

Each dimension of multi-dimensional cube 300 represents any quality, value, attribute, or characteristic useful in distinguishing or grouping entity data. By way of non-limiting example, dimensions may comprise one or more of demographic attributes (such as age, education, gender, income, or the like), channel attributes, customer attributes, color, cost, geographical sector, lead time, price, product attributes, sales volume, service level, variability, and value. Data profiler 211 provides segmentation planner 110 to select one or more dimensions to profile data, either by defining the dimension or by selecting from one of a group of pre-selected dimensions. Furthermore, dimensions may be categorized according to which entity 120 or aspect of an entity 120 to which the dimension relates. For example, embodiments contemplate customer dimensions, product dimensions, and channel dimensions. By way of example only and not by limitation, customer dimensions may include education, income, length of time as customer, gender, geographic sector or region. Although, exemplary dimensions are shown and described, embodiments contemplate any dimensions according to particular needs.

After segmentation planner 110 defines or selects one or more dimensions 308 of entity data using data profiler 211, data profiler 211 sorts the entity data corresponding to the defined or selected dimension 308 according to customer value and/or cost-to-serve intervals. Each interval represents the entire range of values that the entity data takes according to the various measurements of customer value and/or cost-to-serve in relation to the dimension 308 chosen.

For each interval, a segmentation planner 110 defines one or more portions of the interval into segments 310 according to rules 216, clustering algorithms 217, or by segmentation analysis according to input.

Figure 7:
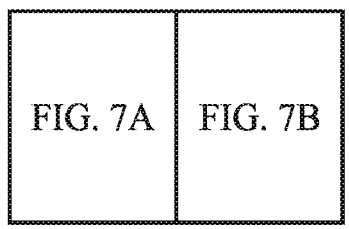
FIG. 7 (depicted as FIGS. 7A and 7B) illustrates customer value and cost-to-serve charts according to an embodiment.
Figure 8:
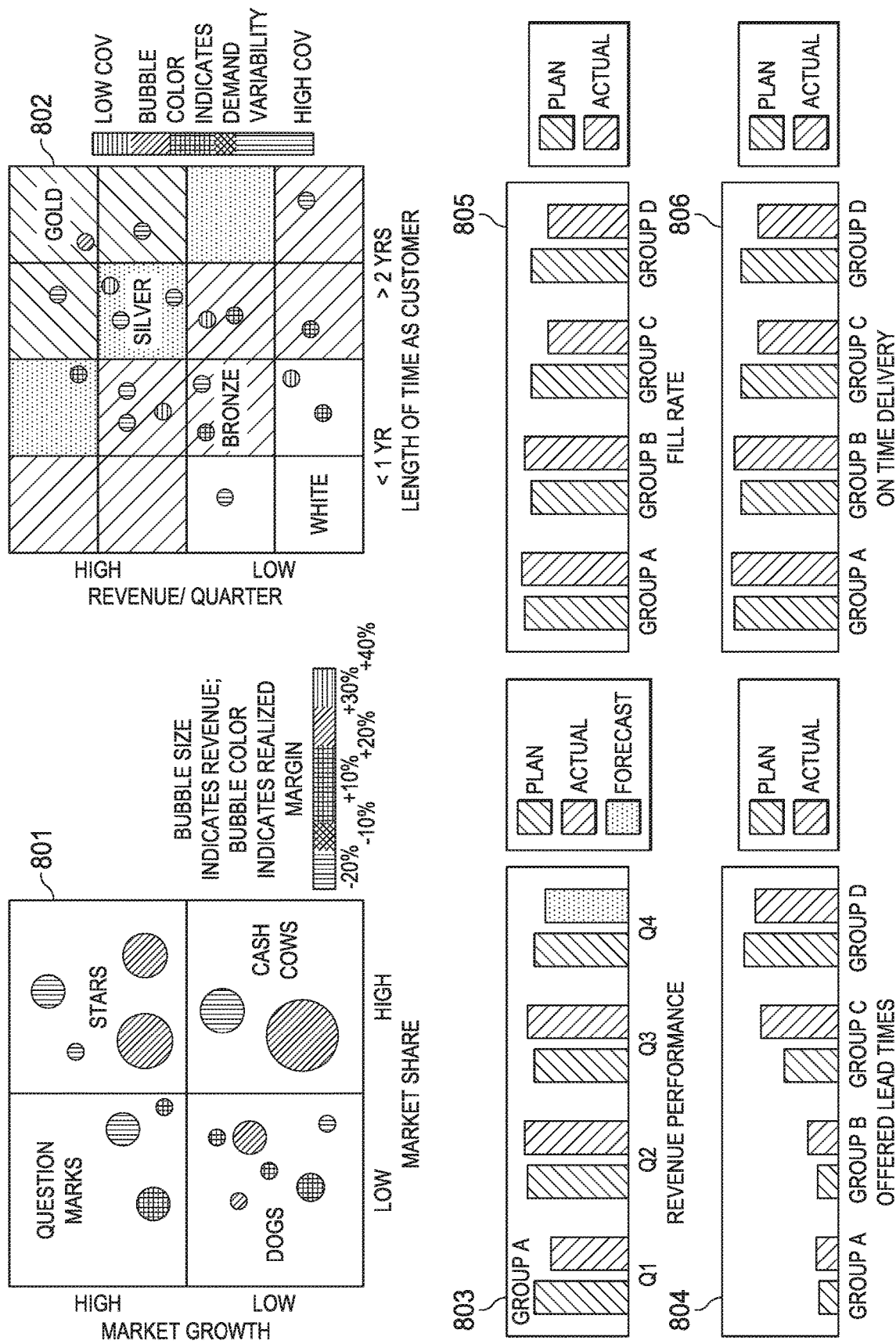
FIG. 8 illustrates segmentation planner reports according to an embodiment.
Figure 9:
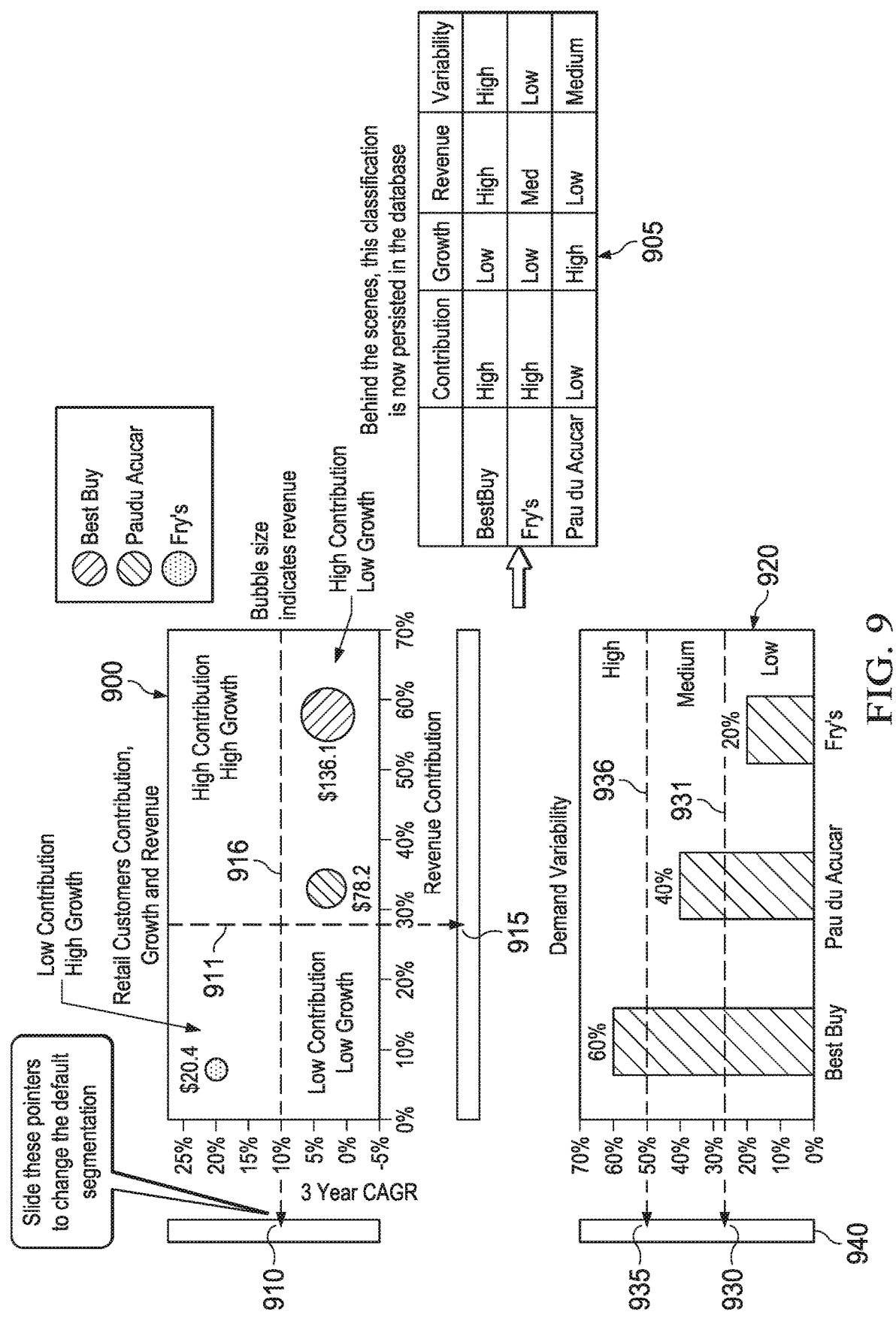
FIG. 9 illustrates a user interface for variable segmentation according to an embodiment.

In one embodiment, data profiler 211 generates charts on output device 134 that plot dimension 308 against one or more value or cost-to-serve measurements, as illustrated in FIGS. 7-9. As will be discussed more fully below, these charts permit a planner to define a segment, create rules 216 or clustering algorithms 217 to define a segment or determine if any value or cost-to-serve intervals cluster into one or more segments 310 along dimension 308. Even if the intervals do not cluster, these charts serve as a graphical interface that permits segmentation planner 110 to define a segment 310 of each dimension 308 by selecting cut-off values for each segment along a value or cost-to-serve interval. For example, where the dimension is "age of customer," segmentation planner 110 may select to define segments as "under 21," "21-35," 35-55," and "over 55," based on the value or cost-to-serve of each age group. These dimensions 308 may likewise be subdivided into segments 310 by a planner or by rules 216 and clustering algorithms 217 based the value or cost-to-serve, or on other criteria relevant to that dimension as the following examples illustrate. For example, education may be subdivided into segments 310 i.e., none, basic, high school, and university. Age may be subdivided into the segments 310 i.e., youth, young, mature, and aged. Gender may be subdivided into the segments 310 i.e., male or female. Income may be subdivided into the segments 310 i.e., low, middle, and high income. Geographic sector may be subdivided into the segments 310 i.e., rural and urban. The foregoing dimensions 308 and segments 310 are merely non-limiting examples, and specific examples of dimensions 308 may be used in some embodiments as segments 310 and vice-versa.

Furthermore, a segment 310 may be defined or expressed in any suitable format, for example, numeric, string, or Boolean format. In addition, a numeric segment may be expressed as numeric value ranges such as absolute value ranges. Relative segments may be expressed as relative values or as percentages of the entities. As an example only and not by way of limitation, for a volume dimension, a fast volume segment may be defined as 0-80% of the volume, a medium segment may be defined as 80-90% of the volume, and a slow segment may be defined as 90-100% of the volume. String segments may be expressed as a string represented by buckets. Boolean segments may be expressed as a positive value indicating that the Boolean segment is satisfied or a negative value indicating that the Boolean segment is not satisfied.

Once each dimension 308 is selected and segments 310 for each dimension 308 are selected or defined, the segment and cluster module 212 organizes each segment-segment overlap into a micro-segment 312.

The segment and cluster module 212 receives dimension 308 and segment 310 selections and data from data profiler 211 and receives input from segmentation planner 110 to organize the data into micro-segments 312 according to rules 216 or clustering algorithms 217, which may be stored in the segment and cluster module 212, segmentation planner 110, and/or developed by segmentation planner 110.

In a preferred embodiment, each micro-segment 312 comprises an overlap of segments 310 along each dimension 308. By way of non-limiting example, the multi-dimensional cube 300 illustrated in FIG. 3 comprises three dimensions 308 each split into three segments 310. The number of micro-segments 312 is therefore twenty-seven. In a multi-dimensional cube comprising two dimensions 308 with three segments 310 and two dimensions 308 with two segments 310, the number of micro-segments 312 would be thirty-six. Although particular dimensions and segments and shown and described, embodiments contemplate any number of dimensions or segments according to particular needs.

After segment and cluster module 212 sorts the entity data into micro-segments 312, the segment and cluster module 212 groups the micro-segments into personas 320 based on rules 216 or clustering algorithms 217 stored therein. In some embodiments, a persona 320 is a user- or computer-defined grouping of micro-segments 312 that share similar cost-to-serve and value tradeoffs so that a similar strategy 430 (FIG. 4) may be used to target all micro-segments 205 in that persona 320. For example, as shown in FIG. 3 first persona 320a is illustrated as a cluster of four micro-segments 312 and second persona 320b is illustrated as a cluster of three micro-segments 312.

In some embodiments, micro-segments 312 may be further segmented into micro-micro-segments 314 according to particular needs. That is, micro-micro-segments 314 represent a micro-segment 312 that is segmented according to further application of segments 310 along a dimension 308 of a micro-segment 312.

In addition, although multi-dimensional cube 300 is shown and described as a 3-dimensional cube in FIG. 3, multi-dimensional cube 300 may also be represented by an n-dimensional shape comprising, for example, 1, 2, 3, 4, . . . n dimensions 308. Likewise, each segment 310, micro-segment 312, or micro-micro-segment 314 may comprise 1, 2, 3, 4, . . . n segments 310, micro-segments 312, or micro-micro-segments 314, respectfully.

In addition, or as an alternative, all features of micro-segments 312 may be applied to micro-micro-segments 314. Further discussion will only use the phrase micro-segments 312, but should be understood as micro-segments 312 and/or micro-micro-segments 314.

Continuing with FIG. 3, after micro-segments 312 are defined and optionally grouped into personas 320, segmentation planner 110 uses strategy interface 213 to assign strategies 430 to one or more of the micro-segments 312 or personas 320 based on a combination of value and cost-to-serve considerations. Each strategy 430 in the strategy interface 213 is associated with tactics 440, postures 450, and policies 460, stored in tactics database 214. Strategy interface 213 may display a graphical interface on computer 130 to a planner that allows selection of a strategy 430 for each micro-segment 312 or persona 320 and allows configuration of tactics 440, postures 450, and policies 460 according to particular needs. In some embodiments, tactics 440, postures 450, and policies 460 are pre-defined and stored in tactics database 208, where specific configurations of each of tactics 440, postures 450, and policies 460 are associated with each strategy 430.

Policies 460 represent supply chain policies that may be implemented into a supply chain plan and executed across a supply chain. Plan exporter 215 uses policies 460 to update plan data 242, constraints 244, and plan policies 246 in plan database 240. Policies 460 may also be used to update and configure transaction systems 230, according to particular needs.

Plan exporter 215 also exports policies 460 to data profiler 211, segment and cluster module 212, and strategy interface 213 which monitor transaction systems 230 to provide data to segmentation planner 110 to refine segments 310, micro-segments 312, strategies 430, tactics 440, postures 450, and policies 460. Although an initial assumption may be made, that a particular micro-segment 205 will behave a particular way, when a persona 320 is assigned, deviations will likely occur. Segmentation planner 110 provides the data received from transaction systems 230 to update the configuration of tactics 440, postures 450, and policies 460 in the tactics database 214 to correct deviations in behavior or performance, or the updating may be automatic based on rules 216.

Figure 4:
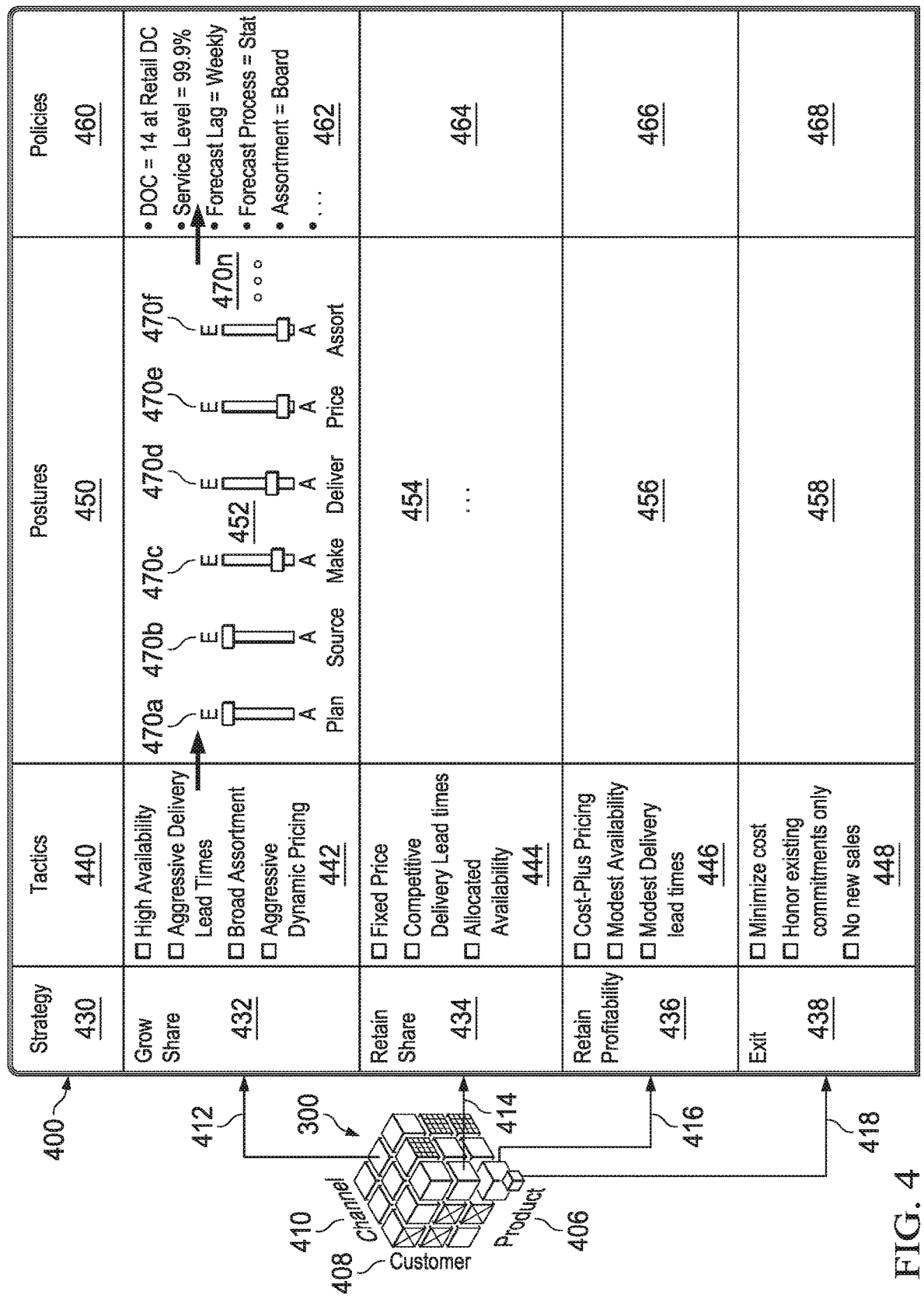
FIG. 4 illustrates the assignment of strategies to micro-segments according to an embodiment.

FIG. 4 illustrates the assignment of strategies 430 to various micro-segments 312 of multi-dimensional cube 300. Multi-dimensional cube 300 of FIG. 4 comprises three dimensions, product 406, customer 408, and channel 410, each split into three segments, represented by three rows of blocks. In this example, product dimension 406 comprises three segments 308. Customer dimension 408 comprises three segments 308, and channel dimension 410 comprises three segments 308. Each intersection of channel dimension 410, customer dimension 408, and product dimension 406 produces a single block, or micro-segment 312. The embodiment of the multi-dimensional cube 300 in FIG. 4 therefore comprises twenty-seven blocks, or micro-segments 312. Each micro-segment 312 represents a potential target for strategy 430. In this manner, segmentation planner 110 assigns strategy 430 to one or more particular micro-segments 312. In some embodiments, strategy 430 is assigned to micro-segment 412 in order to grow a share of a micro-segment 432, retain share of micro-segment 414, retain profitability of micro-segment 416, or exit the market for micro-micro-segment 418. Micro-segment 416 comprises micro-micro-segment 418, for exemplary purposes.

As discussed above, micro-segments 312 may be clustered together to group similar behavior, or persona 320. In some embodiments, where segmentation planner comprises a user interface and the user interface displays a multi-dimensional cube 300, micro-segments 312 sharing the same persona 320 may be displayed with each color representing a single persona 320. By clustering multiple micro-segments 312 into the same persona 320, segmentation planner 110 may target similar business decisions and/or strategies 430 to groups with, for example, similar value-cost trade-offs. In other words, the same value proposition may be offered to multiple micro-segments 312 with common or substantially similar cost-to-serve structures. In some embodiments, segmentation planner 110 (e.g. segment and cluster module 212) forms micro-segments 312 by grouping dimensions with a similar value proposition, or the particular product, comprising particular features that a particular customer is buying at a particular price. In some embodiments, the value proposition is juxtaposed with a cost-to-serve such that both intervals or measurements may be considered in segmenting or assigning a strategy 430. In one embodiment, multi-dimensional cube 300 identifies micro-segments that are particularly advantageous for a particular strategy 430 by identifying each advantageous micro-segment 312 by a specific color. For example, if segmentation planner 110 identifies a micro-segment 312 that shows high product features combined with low cost, multi-dimensional cube 300 may indicate, by a color, that this segment should be targeted with a grow share strategy (e.g. micro-segment 412 targeted with grow share strategy 432). Embodiments contemplate any strategy or strategies 430, according to particular needs.

Once strategy 430 has been assigned to a particular micro-segment 312, then segmentation planner 110 (e.g. strategy interface) displays a menu of tactics 440 or immediately assigns a pre-defined set of tactics 440 to that micro-segment 312. Various strategies 430 may comprise different tactics 440 as demonstrated by the following non-limiting examples. For a grow share strategy 432, grow share tactics 442 are displayed or assigned by segmentation planner 110, which may include: high availability, aggressive delivery lead times, broad assortment, and/or aggressive dynamic pricing. For a retain share strategy 434, retain share tactics 444 are displayed or assigned by segmentation planner 110, which may include: fixed price, competitive delivery lead times, and/or allocated availability. For a retain profitability strategy 436, retain profitability tactics 446 are displayed or assigned by segmentation planner 110, which may include: cost-plus pricing, modest availability, and/or modest delivery lead times. For an exit strategy 438, exit tactics 448 are displayed or assigned by segmentation planner 110, which may include: minimize cost, honor existing commitments only, and/or no new sales. As an example only and not by way of limitation, if the strategy is grow share 432, grow share tactics 442 are displayed or assigned by segmentation planner 110, which may comprise various combinations of tactics 440 that will accomplish this strategy. Segmentation planner 110 may analyze data received from plan database 240, transaction systems 230, or elsewhere in system 100 to determine factors that affect which type of various tactics 442 a grow share strategy 432 will employ, such as the fastest, most efficient, or cheapest tactics 440 for achieving a grow share strategy 432. Embodiments contemplate other tactics 440 to achieve any strategy 430. For each tactic 440, segmentation planner 110 displays a template of suggested postures 450. In addition, or as an alternative, segmentation planner 110 assigns a posture 450 to micro-segment 312 immediately upon selection of a particular tactic 440.

Once strategies 430 and tactics 440 are assigned, segmentation planner 110 assigns parameters 470 to implement tactics 440 for each micro-segment 412. Each specific configuration of parameters 470 may be termed a posture 450. For example, grow share strategy 432 may have a grow share posture 452. Retain share strategy 434 may have a retain share posture 454. Retain profitability strategy 436 may have a retain profitability posture 456. Likewise, exit strategy 438 may have an exit strategy posture 458.

Segmentation planner 110 may modify a posture 450 by changing individual parameters 470, according to particular needs. The number of parameters 470 displayed by segmentation planner 110 may be customized according to particular needs. For example, although FIG. 4 illustrates six grow share parameters 470a-f, embodiments contemplate any number of parameters 470a-n, according to particular needs In some embodiments, grow share posture 452 may comprise grow share parameters 470a-n. Parameters 470 may be configured using slider bars displayed in user interface and which indicate a relative position ranging from "Agile" (or "A") on one extreme, "Efficient" (or "E") on the other extreme, and "Balanced" (or "B") in the middle, such that different parameters 470 may be assigned specific values depending on the particular posture 450 selected. These parameters 470 are stored in tactics database 214 and may be modified by segmentation planner 110 according to rules 216 or clustering algorithms 217 stored therein. Parameters 470 of postures 450 are user-configurable depending on a particular micro-segment 312. Examples of parameters 470 that may be configured are: plan 470a, source 470b, make 470c, deliver 470d, price 470e, assort 470f, and any combination of these or additional parameters 470. Same, similar or further parameters 470 are assignable to any strategy 430, according to particular needs.

For example, plan parameter 470a is user-adjustable between an efficient setting, an agile setting, and a balanced setting. Upon selection of an efficient setting of plan parameter 470a, segmentation planner 110 may update plan data 242, constraints 244, plan policies 246, and/or transaction systems 230 to cause a supply chain plan to be updated monthly and for the updating to be automated, based, for example, on general assumptions about demand. An agile setting of plan parameter 470a may update plan data 242, constraints 244, plan policies 246, and/or transaction systems 230 to cause supply chain plan to updated daily based on forecast and demand. A balanced setting of plan parameter 470a may update plan data 242, constraints 244, plan policies 246, and/or transaction systems 230 to cause supply chain plan to be updated on some time period between a month and a day and for the plan to be based on some combination of forecast, demand, and assumptions. Although particular time intervals are described associated with an efficient, agile and balanced settings, a supply chain plan may be updated at any time interval, according to particular needs.

Similarly, user-selection of an agile or efficient setting of a parameter (a balanced setting being in the middle or a combination of the agile and efficient policy) causes updates to plan data 242, constraints 244, policies 245, and/or transaction systems 230 as illustrated in the following table:

TABLE 1

| Parameter | Agile | Efficient |
|---|---|---|
| Source | Multi-source | Bulk Buy |
|  | Flexible contracts | Economic Order Quantity |
|  | COS Buffer Stocks | Strategic buy |
|  |  | Locked Volume |
| Make | Assemble to Order | Build to Stock |
|  | Make to Order | Max Capacity |
|  | Capable to Promise | Low Changeovers |
|  | High Touch |  |
|  | High Changeovers |  |
| Deliver | Expedites | No expedites |
|  | Air | Ocean |
|  | Less than Truck Load | Full Truck Load |
|  | Flexible Capacity | Economic Order Quantity |

In one embodiment, other parameters 470 are useful for supply chain planning purposes, and policies 245 affected by these parameters 470 include: service levels, postponement models, offered lead times, priorities for tiered budget, demand segment attributes, product segment attributes, supply and/or capacity segment attributes, forecast horizon, forecast lag, model selection, distribution requirements plan/master planning schedule coverage duration, safety stock coverage, safety stock rule, replenishment quantities, ship quantities, forecast adjustment, proration, consumption, master planning priorities, order promising, promising polices, and/or allocation policies. One having skill in the art would recognize how to implement these parameters according to some embodiments based on this disclosure. Posture 450 may be formed from one or more of any combination of these or other parameters 470.

In some embodiments, each strategy 430 or tactic 440 is assignable to posture 450 stored in tactics database 214 that has been pre-determined to achieve that strategy 430. In some embodiments, parameters 470 are adjusted by segmentation planner 110 for each planning cycle based on data received from plan database 240 or transaction systems 230 in order to better correlate a posture 450 to achieve a specific strategy 430.

After posture 450 has been selected by segmentation planner 110 and parameters 470 are defined, segmentation planner 110 assigns policies 460 as described above to plan data 242, constraints 244, plan policies 246, and/or transaction systems 230 in order to implement strategy 430 on which posture 450 is based. According to some embodiments, segmentation planner 110 prepares policies 460 based on the strategy 430, tactics, 440, and/or postures 450. For example, selection of a grow share strategy 432 may set a grow share policy 462 to all entities 120 comprising micro-segment 412, taking into consideration any modifications to parameters 452 made by segmentation planner 110. Similarly, a retain share tactic 434 may correlate to a retain share policy 464; a retain profitability tactic 436 may correlate to a retain profitability policy 466; and an exit tactic 438 may correlate to an exit policy 468. As an example only and not by way of limitation, a grow share policy 462 may comprise, for example, a days of coverage (DOC) of 14, service level equal to 99.9%, forecast lag of weekly, forecast process of stat (i.e. statistical forecasting process), and assortment equal to broad (i.e. a broad assortment of options for a given entity). In some embodiments, once postures 450 are set using, for example, the slider bars for parameters 470, all policies 460 associated with a supply chain are immediately implemented, as discussed above. Embodiments contemplate any policies 460, according to particular needs.

To further illustrate segmentation performed by segmentation planner 110, a non-limiting example is now given. In the following example, FIGS. 5A-5J illustrate an exemplary scenario of segmenting an exemplary portfolio of entities 120 using an exemplary user interface 500. In some embodiments, exemplary user interface 500, comprises one or more modules represented by graphical elements such as portfolio panel 501 and dimension panel 502. Portfolio panel 501 comprises one or more input boxes including a portfolio name input box 510, portfolio description input box 511 and portfolio members input box 512. A user may input the appropriate information in the portfolio input boxes 510-512 according to the desired name, description, and number of members of the portfolio. In the exemplary scenario, the portfolio name 510 is "Chilean Population," the portfolio description 511 is "Chilean Population," and the total members 512 are 17,000,000. In some embodiments, each of the input boxes 510-512 is auto-populated upon selection of portfolio by segmentation planner 110.

In some embodiments, exemplary user interface 500 comprises one or more dimension panels 502. Each dimension panel 502 represents a separate dimension 308 to analyze for a particular portfolio. Each dimension 308 may be further subdivided into segments 310. In the illustrated embodiment, the Chilean Population portfolio is segmented into five dimensions 308, each having segments 310. In illustrated embodiment, age dimension 503 comprises four segments 310: youth, young, mature and aged; income dimension 504 comprises three segments 310: low, middle and high income; gender dimension 505 comprises two segments 310: male and female; education dimension 506 comprises four segments 310: uneducated, elementary education, high school diploma and college educated; and geographic sector dimension 507 comprises two segments 310: rural and urban. Although a particular number of dimensions 308 and segments 310 are shown and described, embodiments contemplate any number of dimensions comprising any number of segments, according to particular needs.

In addition, each dimension panel 502 comprises dimension name input box 513, portfolio drop down box 514, and chart 515, which may comprise headings 516 for segment, description, and percent.

Figure 5A:
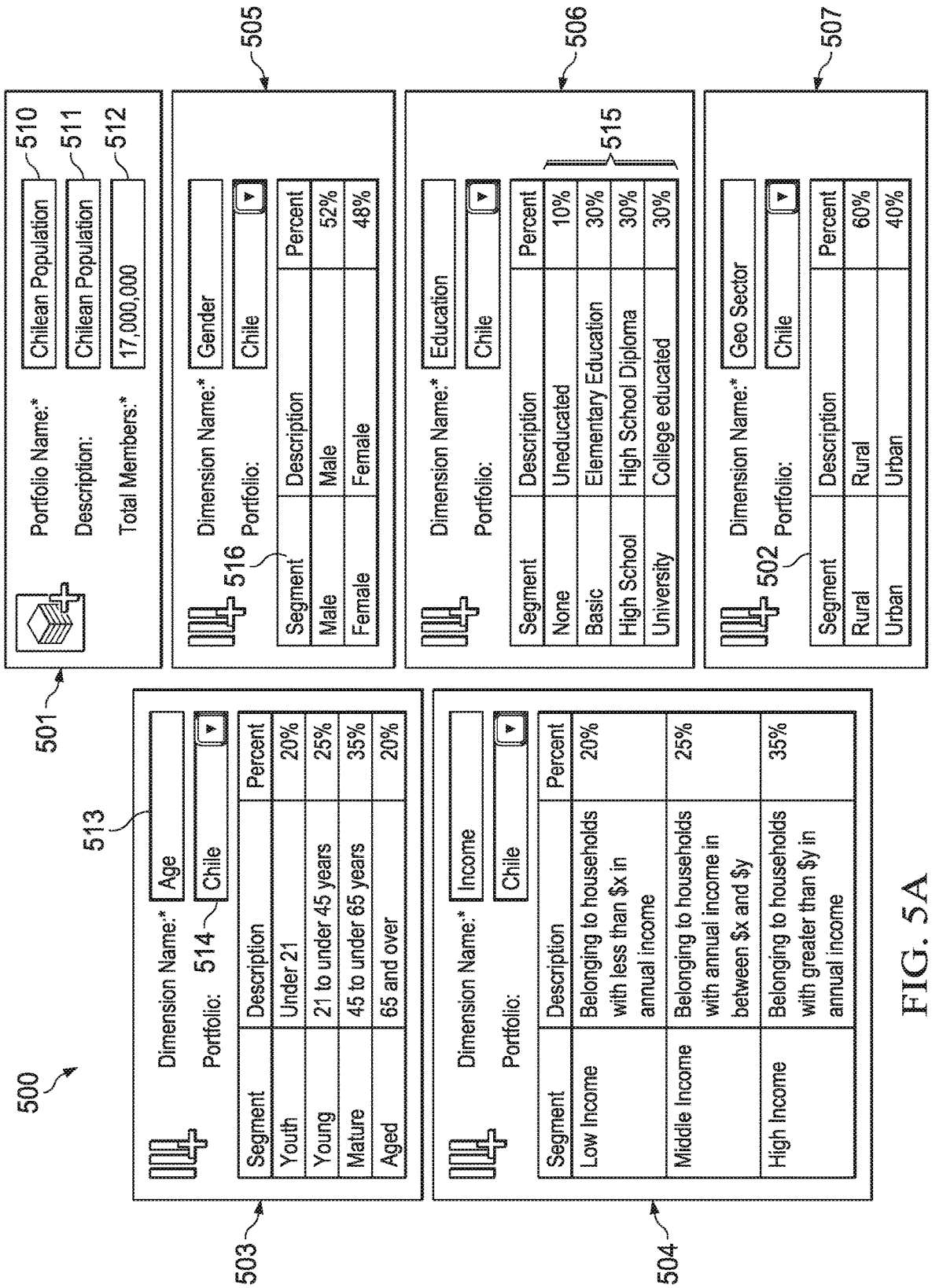
FIG. 5A illustrates an exemplary user interface according to an embodiment.
Figure 5B:
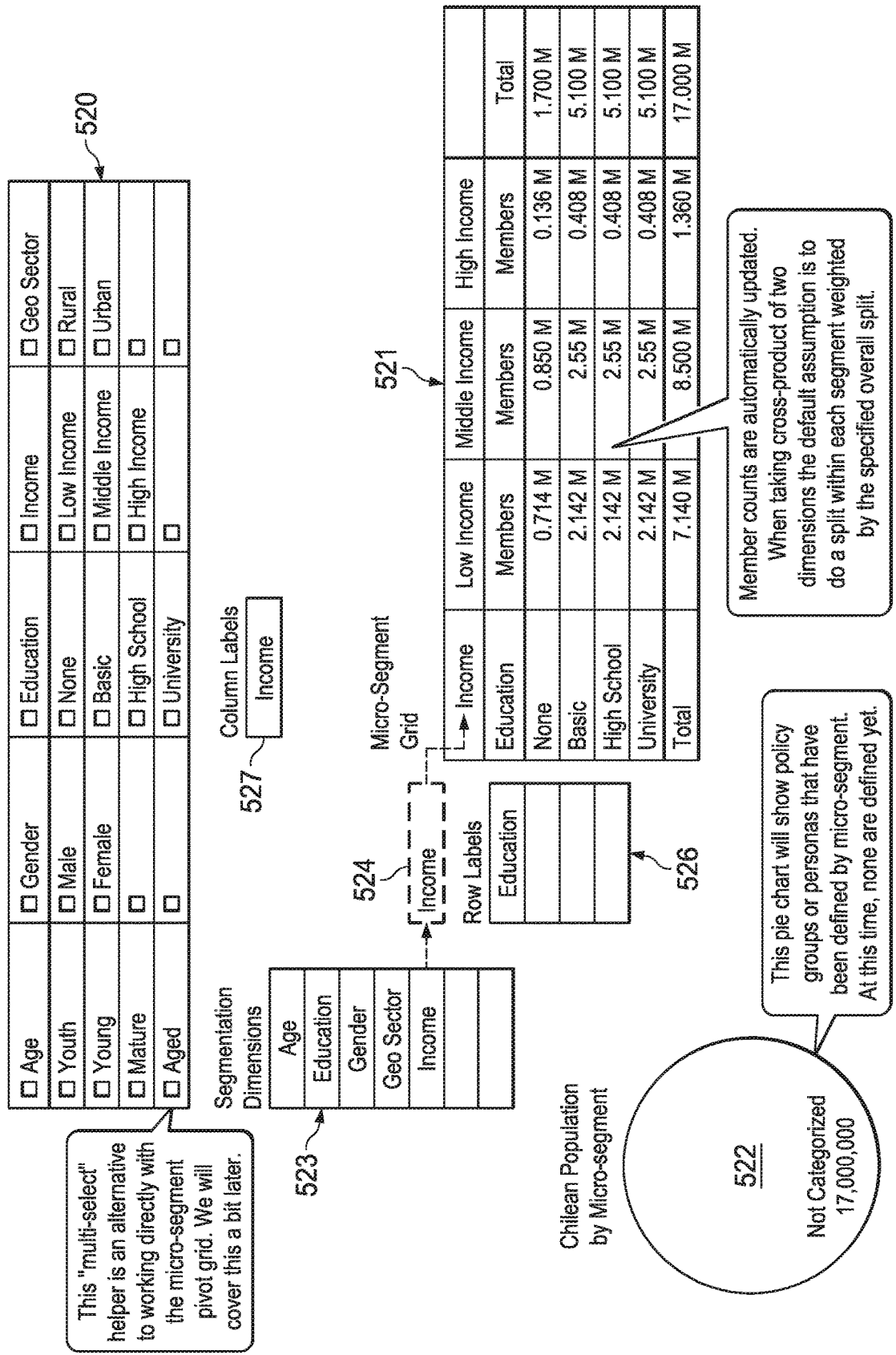
FIG. 5B illustrates an exemplary user interface according to an embodiment.

FIG. 5B illustrates further features of exemplary user interface 500. As illustrated, user interface 500 comprises multi-select helper panel 520, micro-segment grid panel 521, and micro-segment pie chart 522. Additional features include segmentation dimensions panel 523, row labels 526, and column labels 527. In some embodiments, segmentation dimensions 523 are dragged 524 into micro-segment grid chart 521, row labels 526, and column labels 527 to update the micro-segment grid chart by populating the segmentation dimensions 523 as the column or row to where it is dragged. When a first dimension is selected for a column and a second dimension is selected for a row, a micro-segment grid panel 521 populates the segments 310 of each dimension 308 along the row and column. The micro-segment grid panel then populates the number of members of the portfolio that belong to each intersection of each segment. Each intersection of segments 310 is a micro-segment 312. For example, in FIG. 5B, column dimension 308 is selected as income and row dimension 308 is selected as education. In response to the selection, micro-segment grid chart 521 populates income segments along the column of the micro-segment grid chart 521. The micro-segment grid chart populates the education segments along the row of the micro-segment grid chart 521. The micro-segment grid chart calculates the number of members who belong to the micro-segment represented by each intersection of row and column. For example, at the intersection of low income and no education, the micro-segment grid chart 521 automatically populates the 714,000 members of the Chilean Population portfolio described in FIG. 5A that are both low income and have no education. Totals of each column, row, or both may also be depicted in the micro-grid segment chart 521. As an example only and not by way of limitation, a weighted distribution is provided that shows that there are 714,000 people that have low income and no education, and this is calculated for each of the micro-segment grids. In this exemplary scenario, this adds up to the total population of 17 million.

Figure 5C:
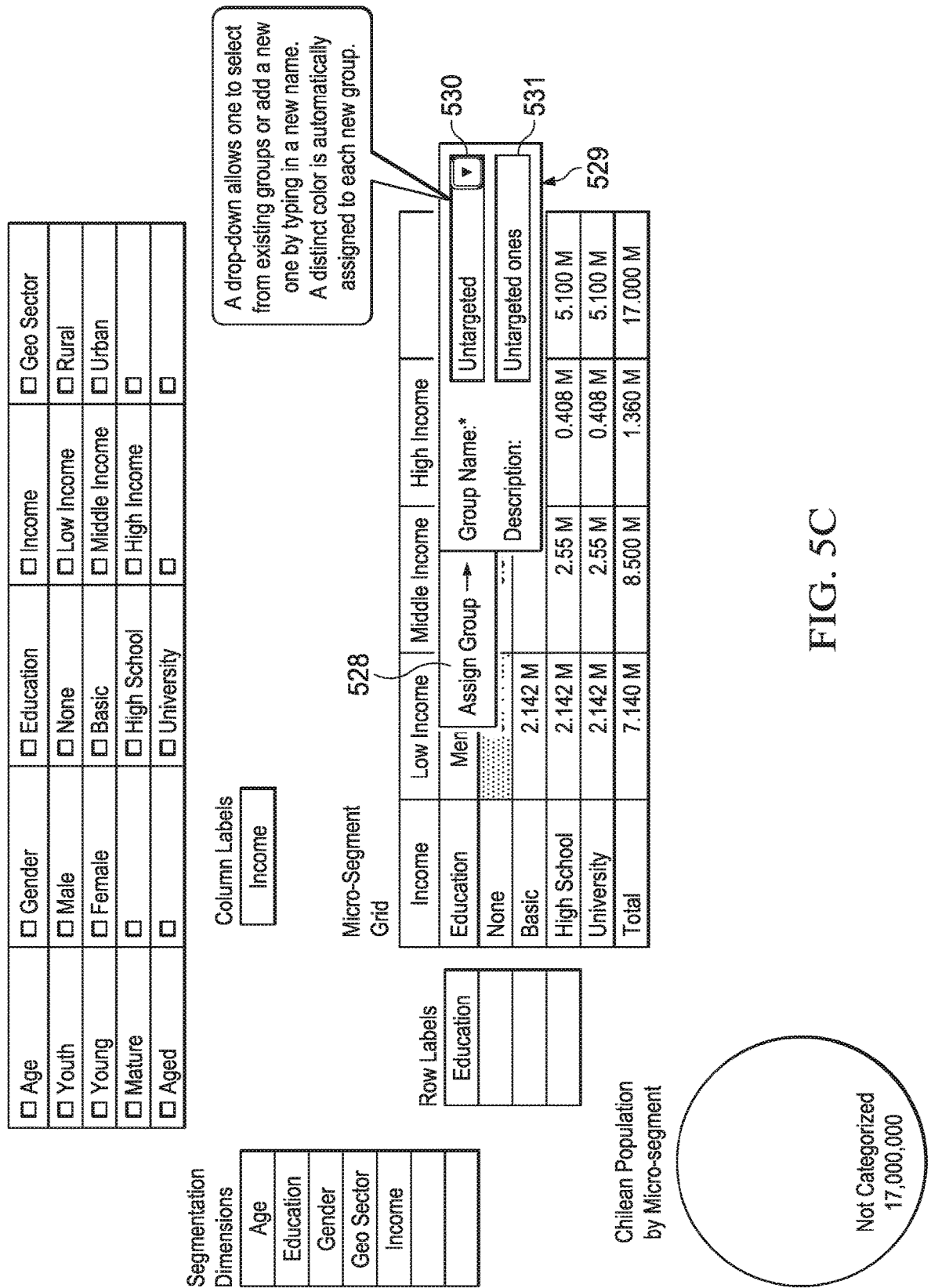
FIG. 5C illustrates an exemplary user interface according to an embodiment.
Figure 5D:
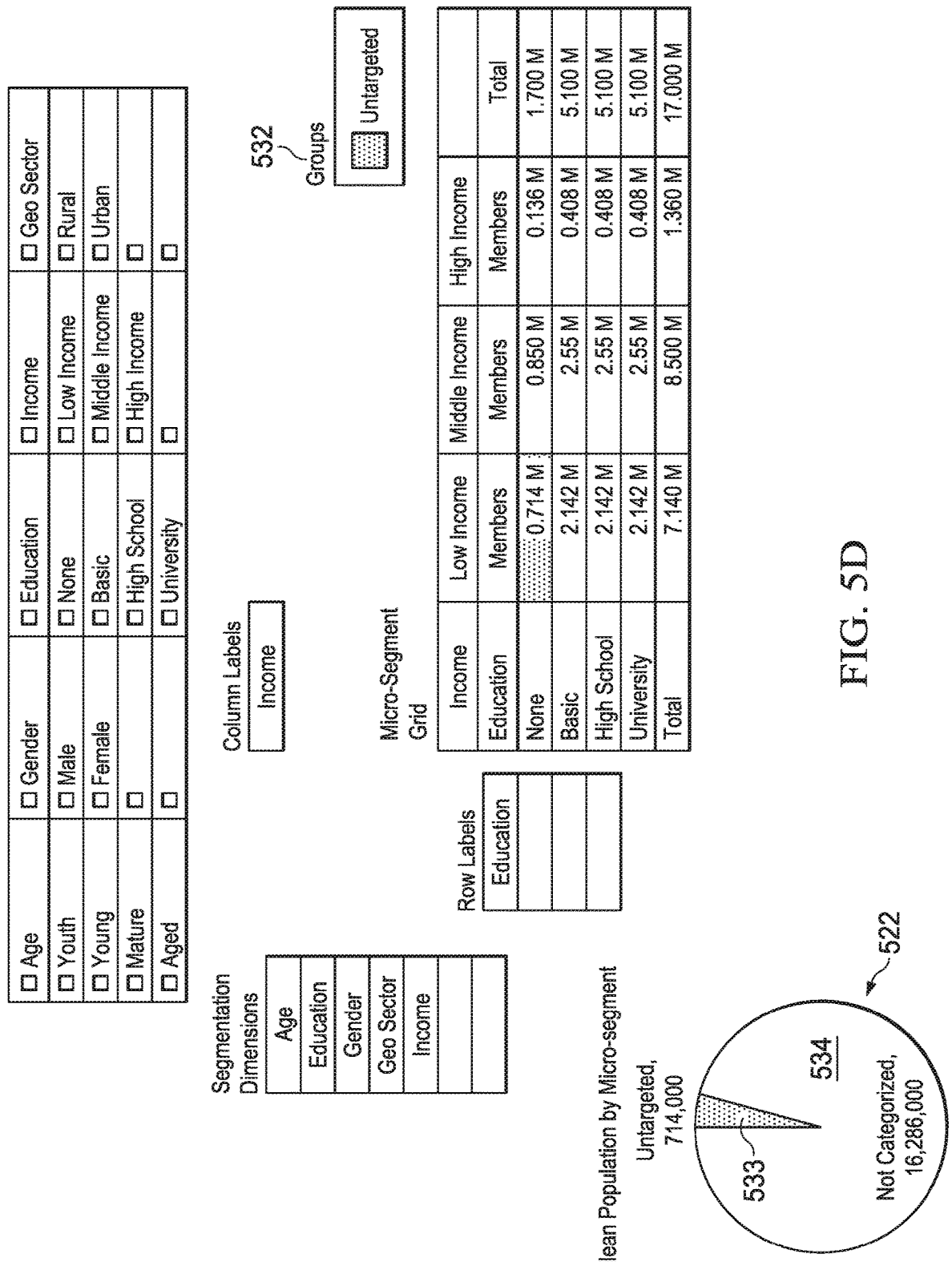
FIG. 5D illustrates an exemplary user interface according to an embodiment.

FIG. 5C illustrates an exemplary embodiment of assigning group labels to micro-segments. In this exemplary scenario, one or more micro-segments are grouped together into a persona under a single group label. When an assign group action 528 is initiated, by, for example, selecting a menu option or right clicking on a micro-segment in the micro-segment grid chart, a dialog box 529 appears including group name drop-down box 530 and description input box 531. A group name may be selected from the group name drop-down box 530, which will cause segmentation planner 110 to assign a group label and a color to the selected micro-segment. A user may specify in the description input box 531 text that will be useful in identifying the group that has been assigned. In some embodiments, a segmentation planner will automatically assign a distinct color for each new group. In other embodiments, a user may select from existing groups in the group label drop-down box 530 or create a new group label by typing in a new name. In the illustrated embodiment, "Untargeted" is selected as the group label for the micro-segment comprising the Chilean Population with low income and no education. In FIG. 5D, the micro-segment comprising the Chilean Population with low income and no education has been assigned a color, and a Groups label 532 has been created that lists the names of groups that have been assigned in the micro-segment grid chart 521. Furthermore, pie chart 522 is automatically populated depicting the untargeted group 533 and the non-categorized group 534.

Figure 5E:
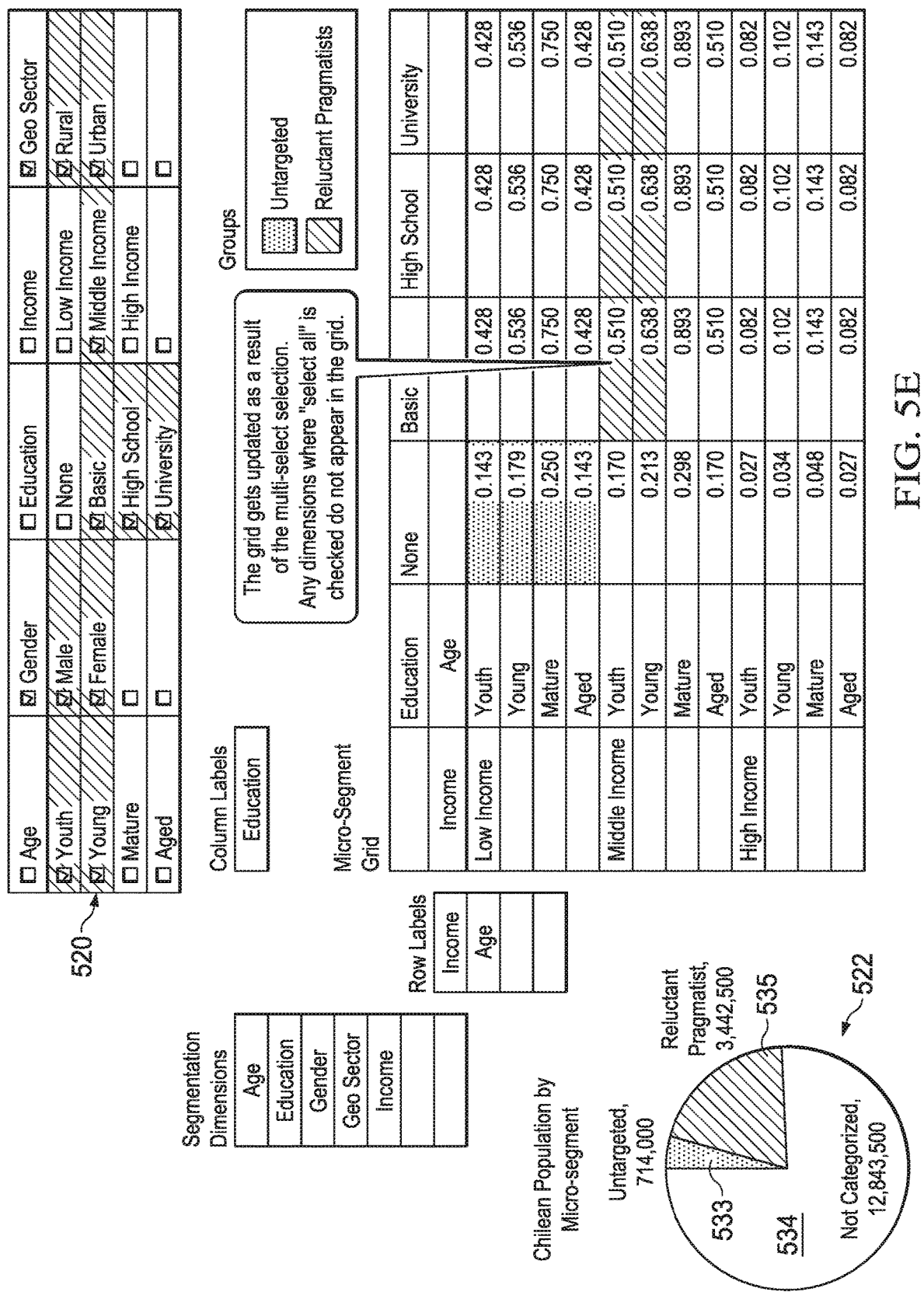
FIG. 5E illustrates an exemplary user interface according to an embodiment.

FIG. 5E illustrates use of multi-select helper panel 520 to assign group labels to micro-segments. Multi-select help panel 520 comprises column headings representing one or more dimensions. Rows under each column may represent one or more segments. Each column heading dimension and each row segment may be associated with a radio selection box. If a radio selection box for a column heading is selected, each row in that column is automatically selected. Additionally, a radio selection box may be selected next to a row segment. Each row segment that is highlighted may appear as a selection of micro-segments in the micro-segment grid chart 521 that fulfill all the intersection of each row segment selection selected in the multi-select helper panel 520. In some embodiments, if all segments of a dimension are selected, that dimension is not represented in the micro-segment grid chart 521. In the illustrated embodiment, a group label, "reluctant pragmatists" is associated with the age segments youth and young, the gender segments male and female, the education segments, basic, high school, and university, the income segment, middle income, and the geographical sector rural and urban. In the illustrated embodiment, the dimensions of gender and geographic sector are not represented on micro-segment grid chart 521. The reluctant pragmatists label color is automatically assigned to the micro-segments that fulfill all the requirements that are selected in the multi-select helper panel 520. Pie chart 522 is automatically updated with the number of reluctant pragmatists depicted on the chart 535.

Figure 5F:
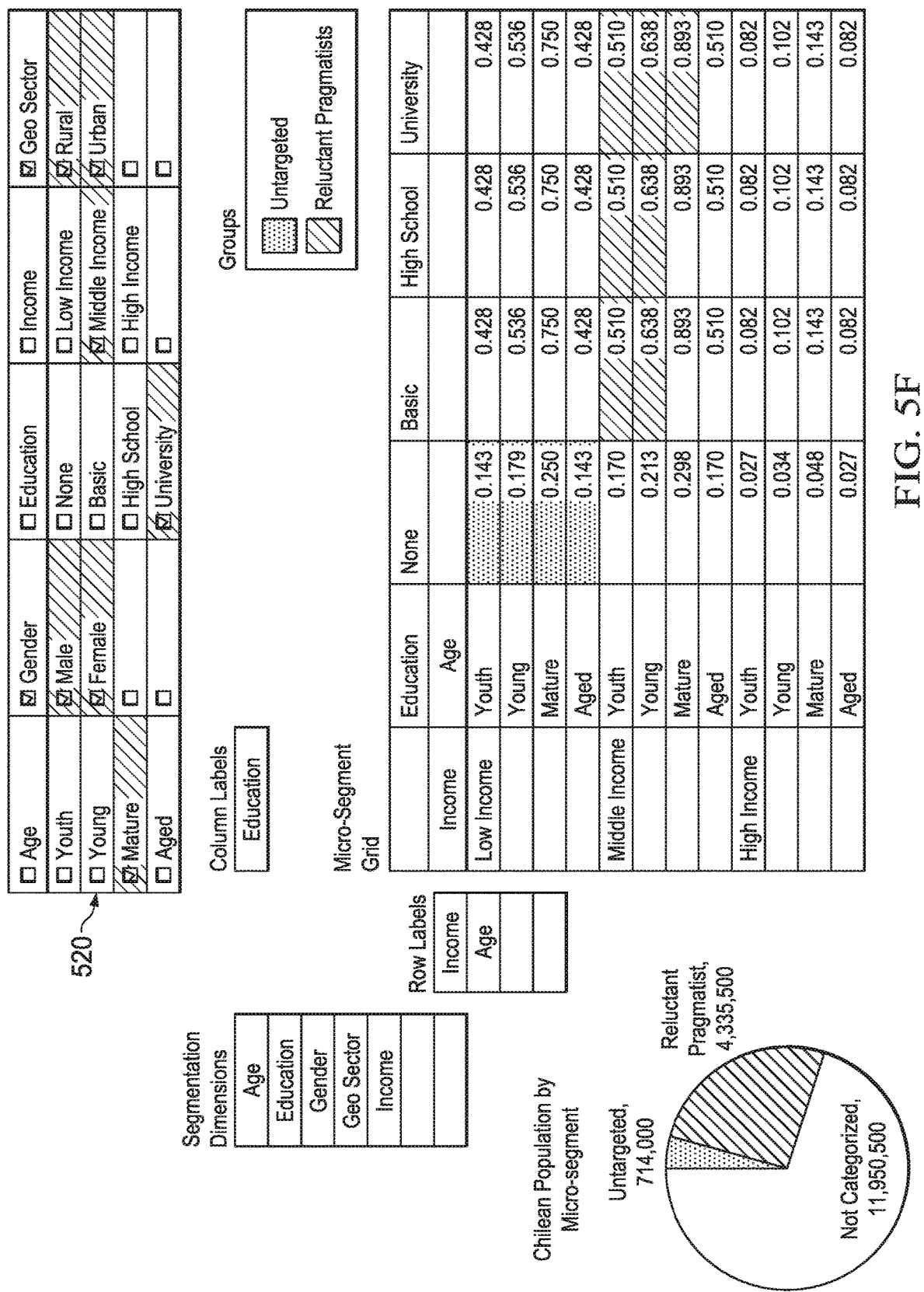
FIG. 5F illustrates an exemplary user interface according to an embodiment.

FIG. 5F illustrates using a multi-select helper panel 520 to select an additional micro-segment to assign to the group reluctant pragmatists. In the illustrated embodiment, the age segment, mature, gender segments male and female, the education segment, university, the income segment, middle income, and the geographical sectors, rural and urban have been selected. The group label reluctant pragmatists is then assigned to the one or more micro-segments that belong to these segments. The micro-segment is assigned the same color as the other selected reluctant pragmatists micro-segments and the pic chart 522 is updated accordingly.

Figures 1, 5G:
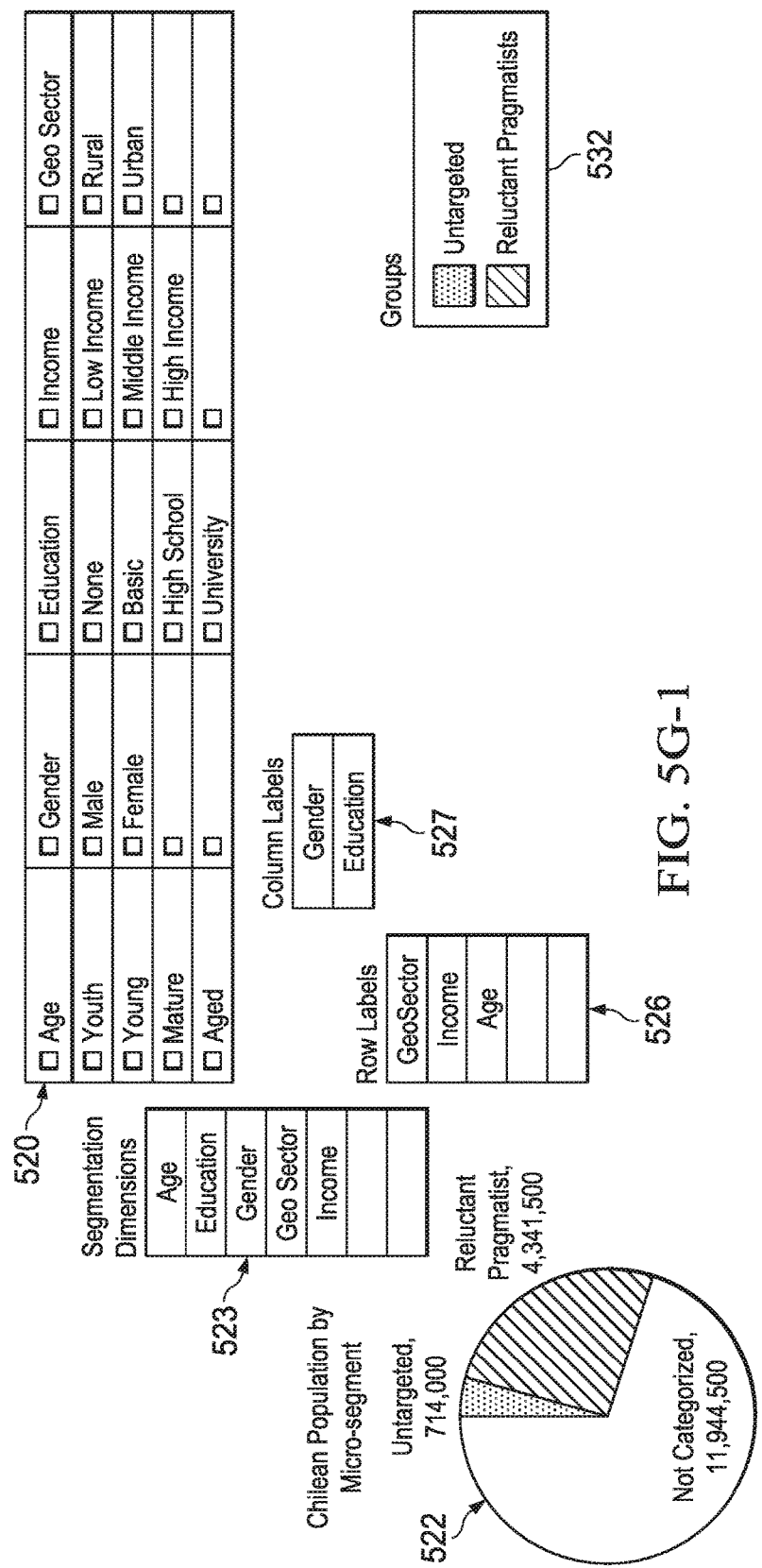
FIG. 5G (depicted as FIGS. 5G-1 and 5G-2) illustrates an exemplary user interface according to an embodiment.
Figure 5G:
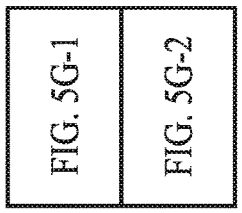

FIG. 5G (depicted as FIGS. 5G-1 and 5G-2) illustrates an exemplary embodiment displaying a user interface with the segments of geographic sector, income and age dimension with the gender and education dimension displayed. Group labels have been assigned to untargeted and reluctant pragmatists. Segmentation dimensions 523 displays all segments depicted on the micro-segment grid chart 521. Row labels 526 display the rows displayed on the micro-segment grid chart; and column labels 527 display the columns displayed on the micro-segment grid chart.

Figure 5H:
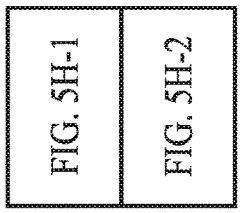
FIG. 5H (depicted as FIGS. 5H-1 and 5H-2) illustrates an exemplary user interface according to an embodiment.
Figures 1, 5H:
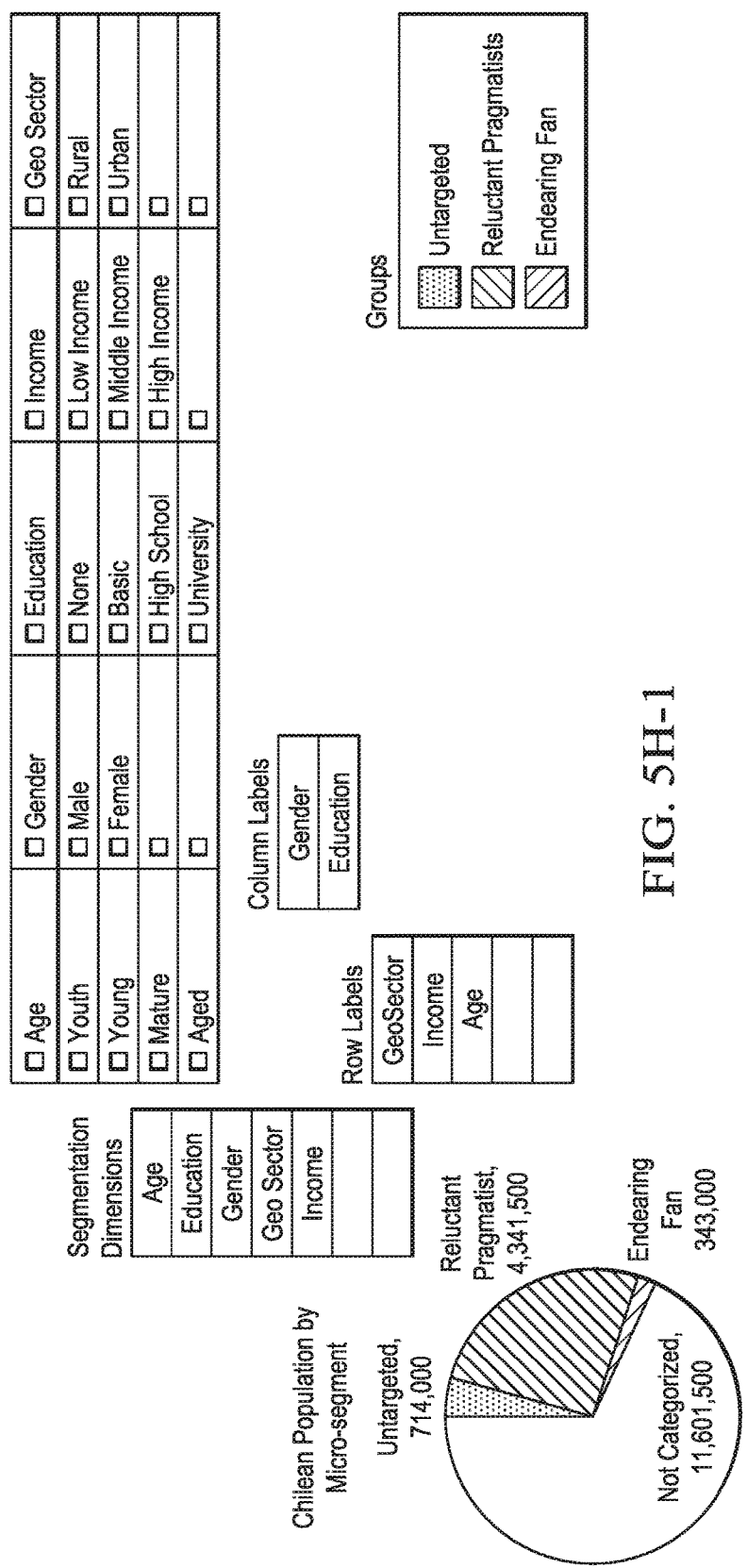
Figures 1, 2, 5I:
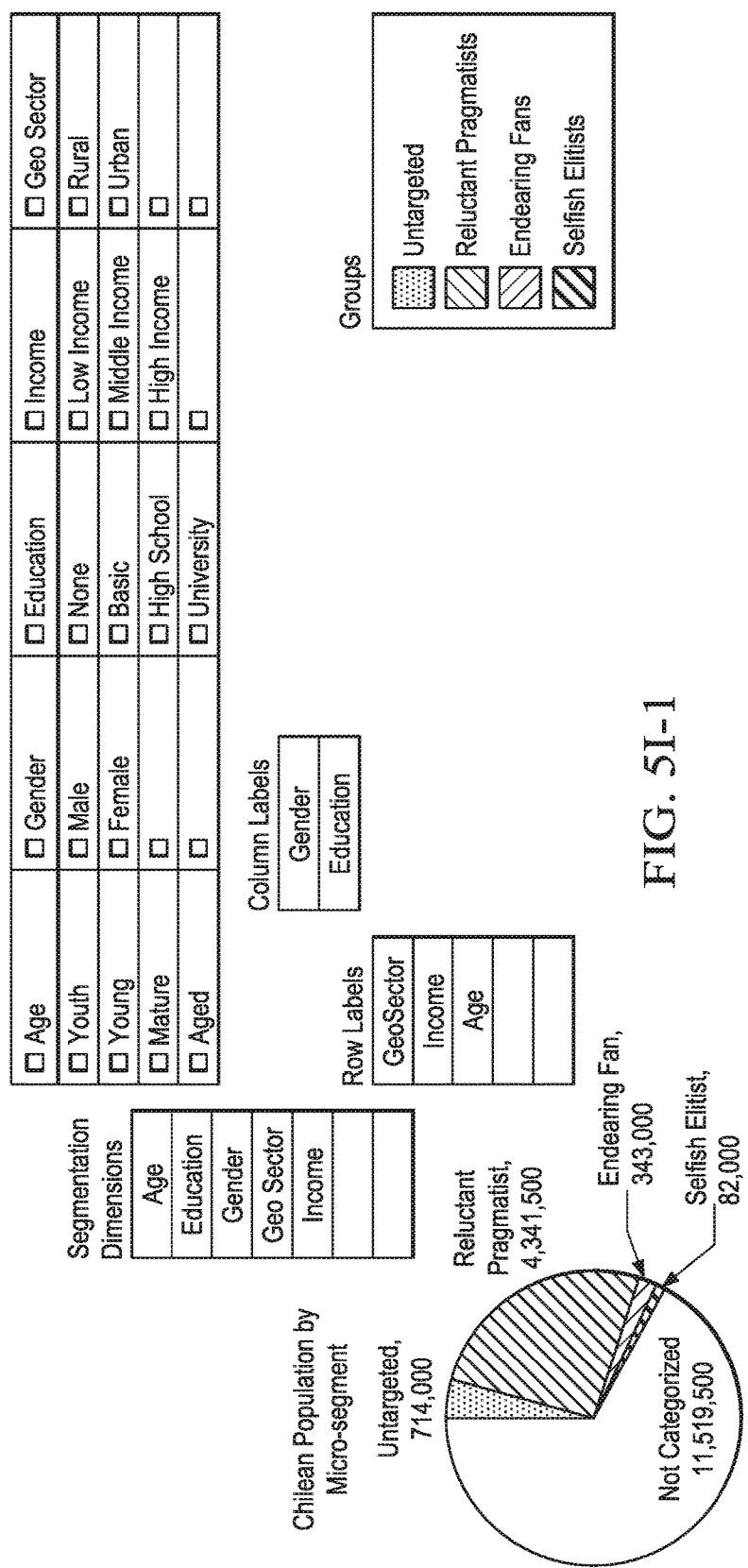
FIG. 5I (depicted as FIGS. 5I-1 and 5I-2) illustrates an exemplary user interface according to an embodiment.

FIG. 5H (depicted as FIGS. 5H-1 and 5H-2) illustrates the further group label endearing fan added to the micro-segment grid chart 521. The groups 532 is automatically updated with the group label, and the selected micro-segments are automatically colored according to the color depicted next to the group label. The pie chart 522 is updated with numbers representing the amount of members contained in the micro-segments assigned to each of the groups. FIG. 5I (depicted as FIGS. 5I-1 and 5I-2) is similar and illustrates the further group label, selfish elitists, updated in the user interface.

Figure 5J:
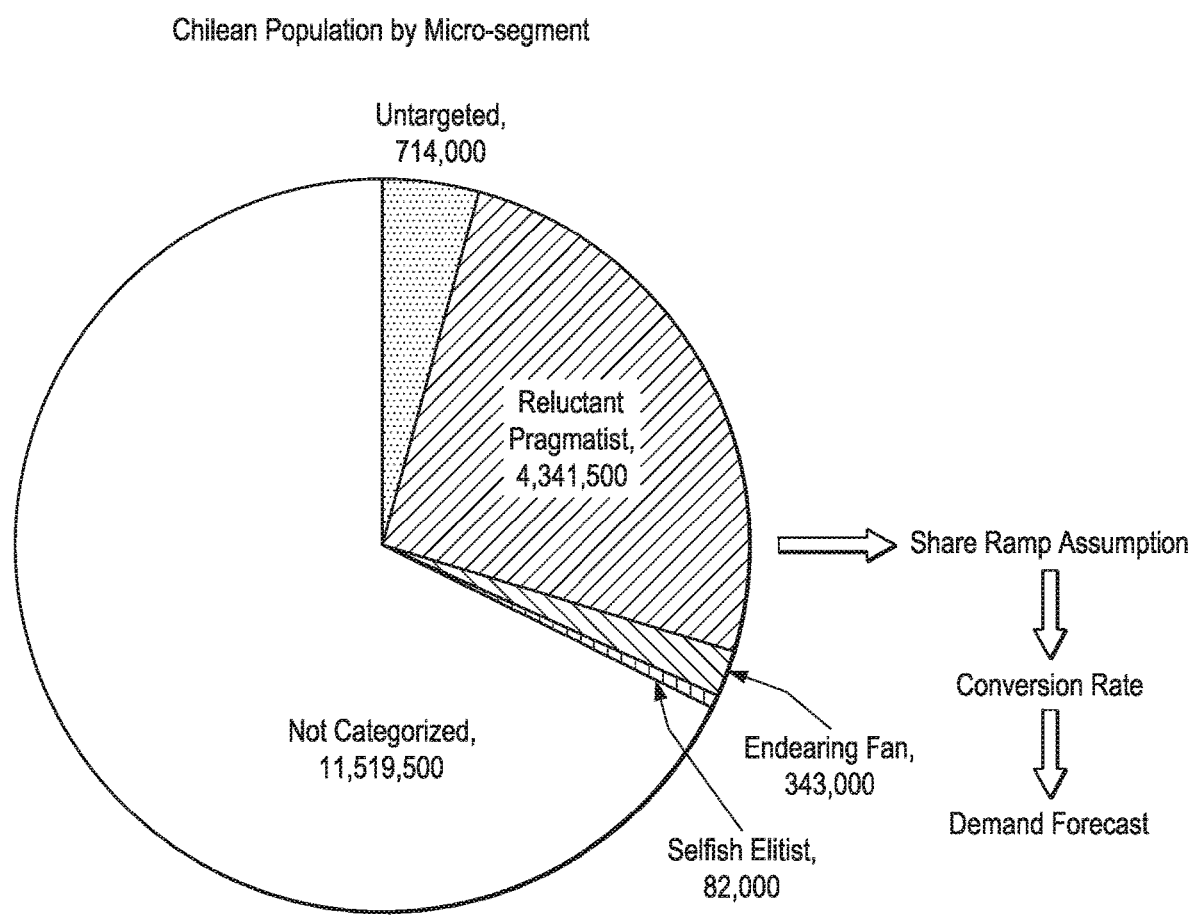
FIG. 5J illustrates an exemplary user interface according to an embodiment.

FIG. 5J illustrates a summary of the micro-segment assignments according to the exemplary scenario. As discussed above, although particular dimensions 308, segments 310, micro-segments 312 and personas 320 are shown and described, embodiments contemplate any particular dimensions 308, segments 310, micro-segments 312 or personas 320, according to particular needs.

Figure 6:
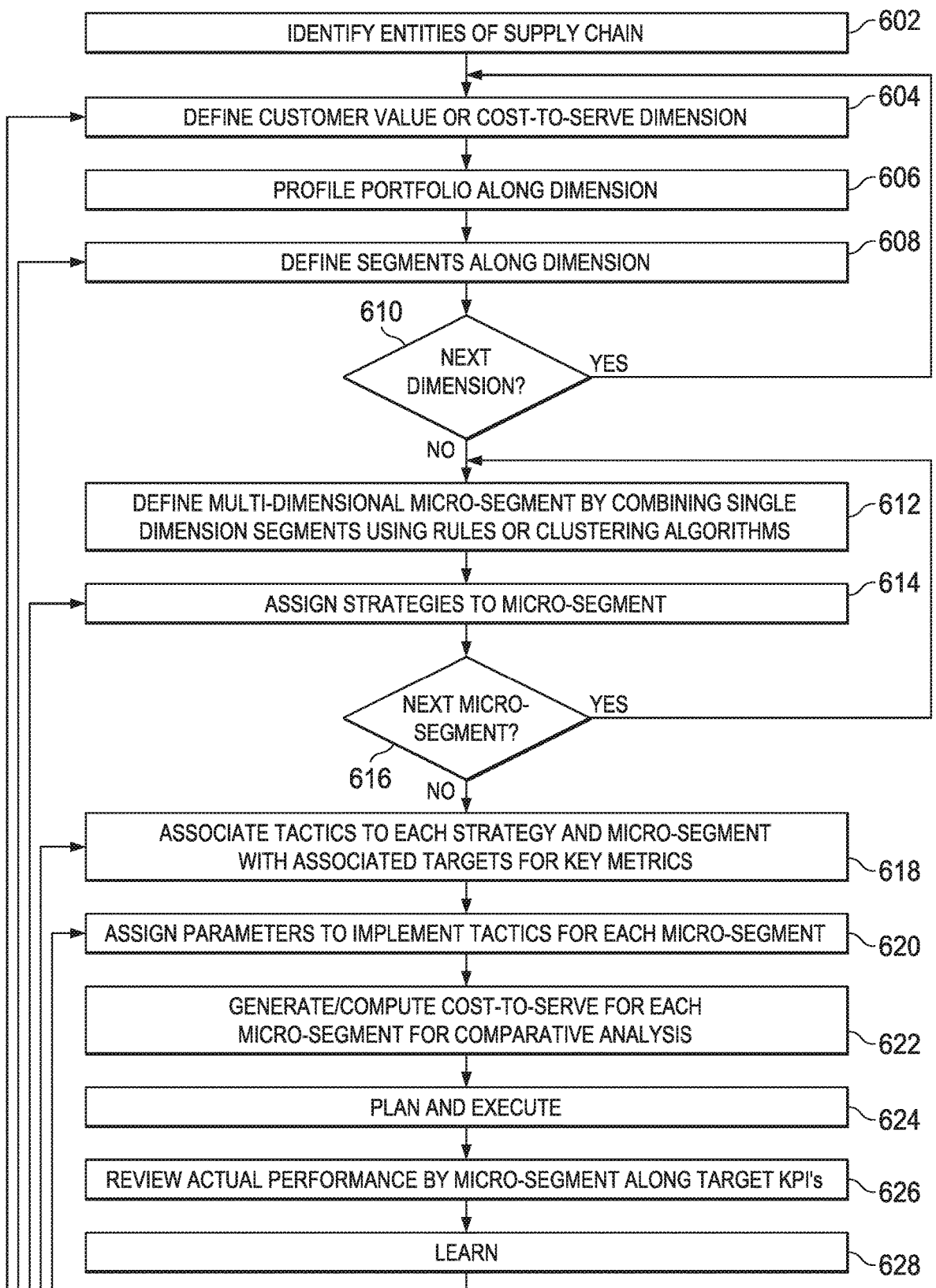
FIG. 6 illustrates a method for segmentation planning.

FIG. 6 illustrates a flow chart of an exemplary method representing a "bottom-up" embodiment of segmentation. The method begins at step 602, where segmentation planner 110 identifies one or more entities 120 of the supply chain. As discussed above, an entity may be, for example, products, customers, channels, locations and the like. Embodiments contemplate any number of entities, according to particular needs. Next, in step 604, segmentation planner 110 defines one or more dimensions 308 for the one or more entities 120. As an example only and not by way of limitation, these dimensions may include price, lead time, service level, number of features, colors, forecast error, variability, and volume. Embodiments contemplate any number of dimensions, according to particular needs.

Figure 7A:
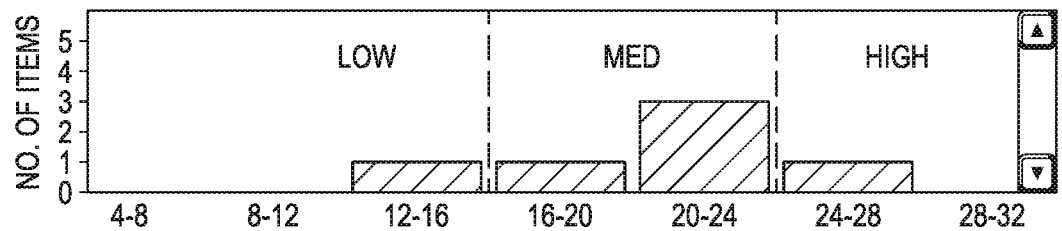
Figure 7A:
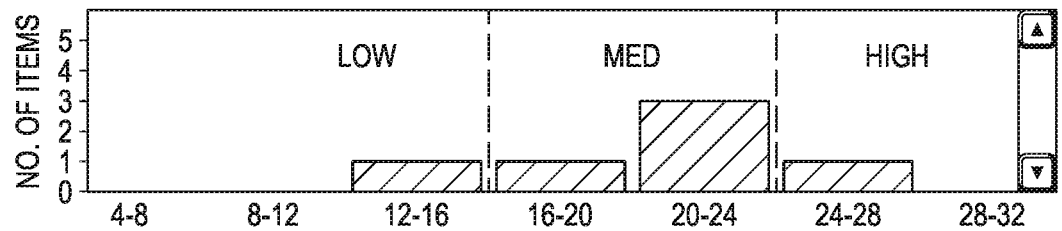
Figure 7A:
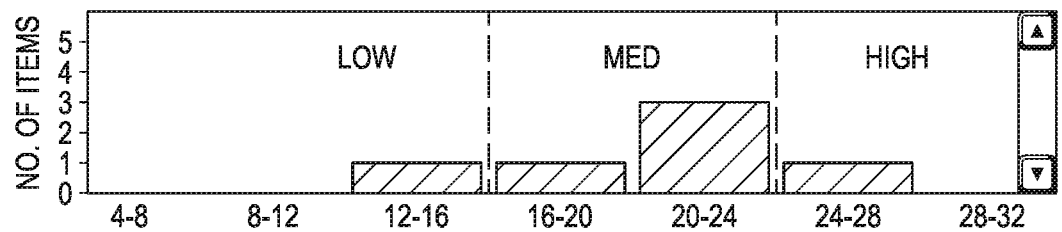
Figure 7B:
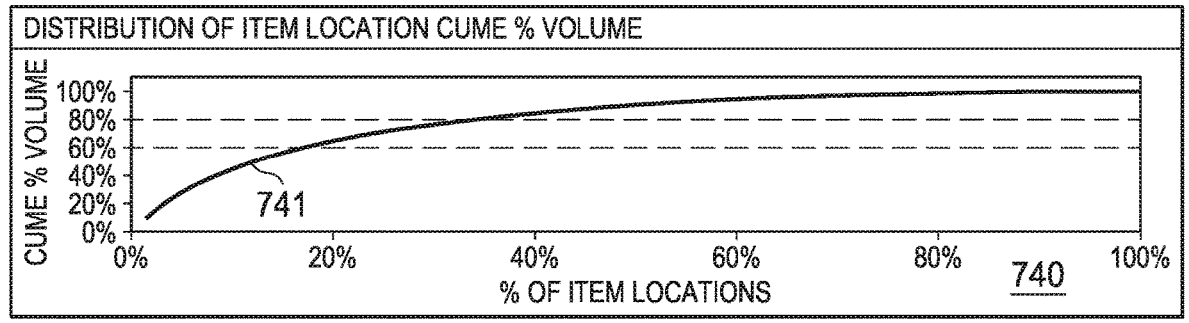
Figure 7B:
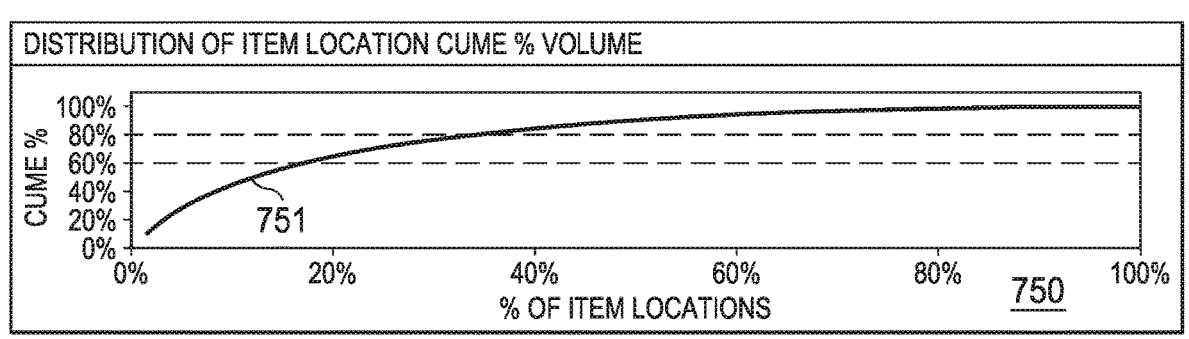
Figure 7B:
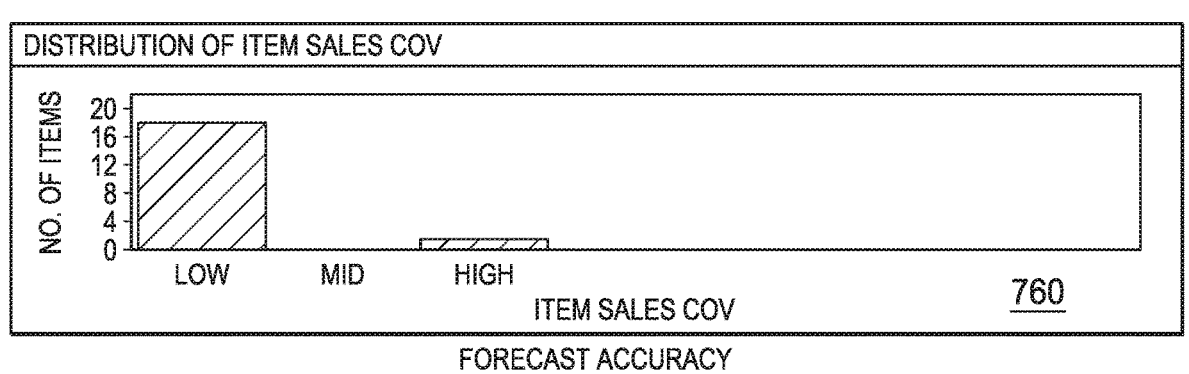
Figure 7B:
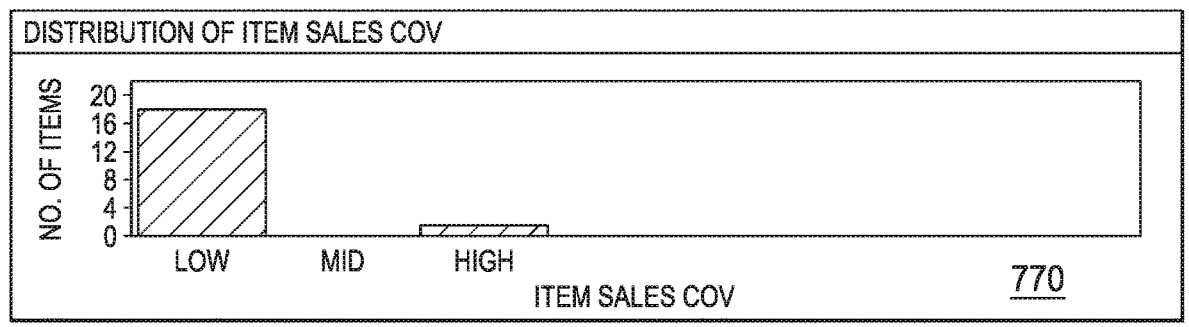

In step, 606, segmentation planner 110 profiles the dimension according to customer value and cost-to-server intervals, by for example, mining the entity data using histograms and Pareto charts, curves and the like and generating curves and boundaries, as illustrated in FIG. 7 (depicted as FIGS. 7A and 7B).

In step 608, segmentation planner 110 defines the segments 310 along each dimension 308. In some embodiments, each dimension is segmented into, for example, a first, second, and third segment 310, one dimension 308 at a time, as illustrated in FIG. 7 (depicted as FIGS. 7A and 7B). At step 610, a determination is made whether to define one or more additional dimensions 308. If further dimensions 308 are to be defined, the method returns to step 604 to define the next dimension 308. If a further dimensions 308 are not to be defined, the method proceeds to step 612.

In step 612, segmentation planner 110 defines micro-segments 312 by combining segments 310 using rules 216 or clustering algorithms 217. As an example only and not by limitation, micro-segment 312 may be the combination of high volume segment 308, low variability segment 308, and high margin segment 308. In some embodiments, segmentation planner 110 employs clustering algorithms 217 and/or rules 216 to utilize entity data and develop segments 308 or micro-segments 312 that demonstrate, for example, clusters or ranges of data that identify micro-segments. These clusters or ranges of data may be represented by histograms or by multi-dimensional cube 300.

In step 614, segmentation planner 110 assigns a strategy 430 to micro-segment 312. As discussed above, available strategies 430 include grow share, retain share, retain profitability, exit, or the like. Embodiments contemplate any strategy or any number of strategies according to particular needs. At step 616, a determination is made whether to assign strategies 430 to additional micro-segments 312. If additional strategies 430 are to be assigned to other micro-segments 312, the method returns to step 612 to define the next micro-segment 312. If additional strategies 430 are not to be assigned to more micro-segments 312, the method proceeds to step 618.

In step 618, segmentation planner 110 associates tactics 440 to each strategy 430 and micro-segment 312 with associated targets for key metrics. In some embodiments, tactics 440 include high availability, aggressive delivery lead times, broad assortment, aggressive dynamic pricing and the like. Embodiments contemplate any tactic, according to particular needs.

In step 620, segmentation planner 110 assigns parameters 470 to each tactic 440, strategy 430, or micro-segment 312 to implement the tactics 440 associated with each micro-segment in step 618. Next, in step 622, segmentation planner 110 calculates and displays the cost-to-serve and/or value interval for each micro-segment 312 for comparative analysis. In step 624, segmentation planner 110 updates plan data 242, constraints 244, and/or plan policies 246 and executes the plan. At step 626, segmentation planner 110 assigns Key Performance Indicators (KPIs) to each micro-segment 312 and monitors performance of each micro-segment according to the KPIs. Segmentation planner 110 generates refined data and values for micro-segments 312, strategies 430, tactics 440, and parameter 470 settings. The method comprises a learning feedback loop at step 628, which recognizes and reacts to unplanned events and changing conditions and refines micro-segments 312, strategies 430, tactics 440, and parameter 470 settings.

FIG. 7 (depicted as FIGS. 7A and 7B) illustrates cost-to-serve and customer value charts. In some embodiments, segmentation planner 110 generates one or more customer value charts 700 illustrating, for example, average realized price 710, 80th percentile of requested lead times 720, or required service levels 730. In some embodiments, where value equates to price, service, urgency, or some combination of like concepts, value may also be more or fewer dimensions. In addition to value charts 700, segmentation planner 110 generates one or more cost-to-serve charts 705, which illustrate, for example, realized cost 740, historical volume 750, forecast accuracy 760, or demand variability 770. Cost-to-serve chart 705 illustrates the cost to deliver a value. In some embodiments, segmentation planner 110 generates a Pareto chart, illustrated by lines 741 and 751, in realized cost chart 740 and historical volume chart 750, respectively. In some embodiments, cost-to-serve comprises one or more dimensions including, for example, product, customer, channel, or a combination of one or more of like concepts, e.g., a specific product for a specific customer.

Segmentation of a portfolio along cost-to-serve and value intervals provides a method to design supply chain cost structures that match appropriate customer value, for example, matching a low cost structure with a low customer value expectation. In this way, a supply chain cost structure can be designed which avoids high cost structures supporting a low customer value expectation. Embodiments contemplate value and cost-to-serve calculated according to any appropriate value and/or cost-to-serve rule or formula.

FIG. 8 illustrates for the sake of simplicity and without loss of generalization, embodiments representing exemplary reports generated by segmentation planner 110. Embodiments contemplate any number of reports, according to particular needs. As an example only and not by way of limitation, these reports may include bubble chart of Market Growth versus Market Share 801, further broken down by revenue and margin, a bubble chart of Revenue per Quarter versus Length of Time as Customer 802, further broken down by demand variability, and various charts representing revenue performance 803, offered lead times 804, fill rate 805, and on time delivery 806.

FIG. 9 illustrates an exemplary user interface for adjusting of segmentation. Segmentation planner 110 generates bubble chart 900 depicting retail customers, contribution, growth and revenue and displays on output device 134. Bubble chart 900 comprises a Y-axis slider 910 and an X-axis slider 915. A user may slide a pointer on each of these sliders to subdivide or segment various dimensions according to user preference. For example, a user may slide the Y-axis slider 910 representing a 3-year compound annual growth rate (CAGR) percentage to move a Y-axis divider line 911 according to a user preference. Similarly, a user may slide the X-axis slider 915 representing revenue contribution to move an X-axis divider line 916 according to a user preference. In this manner a user defines segments 310 and/or micro-segments 312. In some embodiments, a user classification may cause segmentation planner 110 to update a database with a user-specified classification 905. For example, a Y-axis divider line 911 may divide customers into low-growth and high-growth customers based on a 3-year CAGR. A user may adjust the Y-axis divider line to place some customers into a high-growth category and others into a low growth category. Similarly, an X-axis divider line 916 may divide customers into low-contribution and high-contribution customers based on a revenue contribution percentage. A user may adjust the X-axis divider line to place some customers into a low-contribution category and others into a high-contribution category.

Demand variability chart 920 illustrates use of a two-pointer vertical slider 940. Demand variability is illustrated by bar chart 920. Any number of entities, here customers, may be illustrated by the chart. A user may adjust a first slider 935 to move a first vertical divider line 936 to divide customers between a first and second segment 310. A user may adjust a second slider 930 to move a second vertical divider line 931 to divide customers between a second and third segment 310. In this manner, various entities can be categorized into various segments 310 by a user interface. Embodiments contemplate any number of entities 120, segments 310, or sliders according to various needs.

Figure 10:
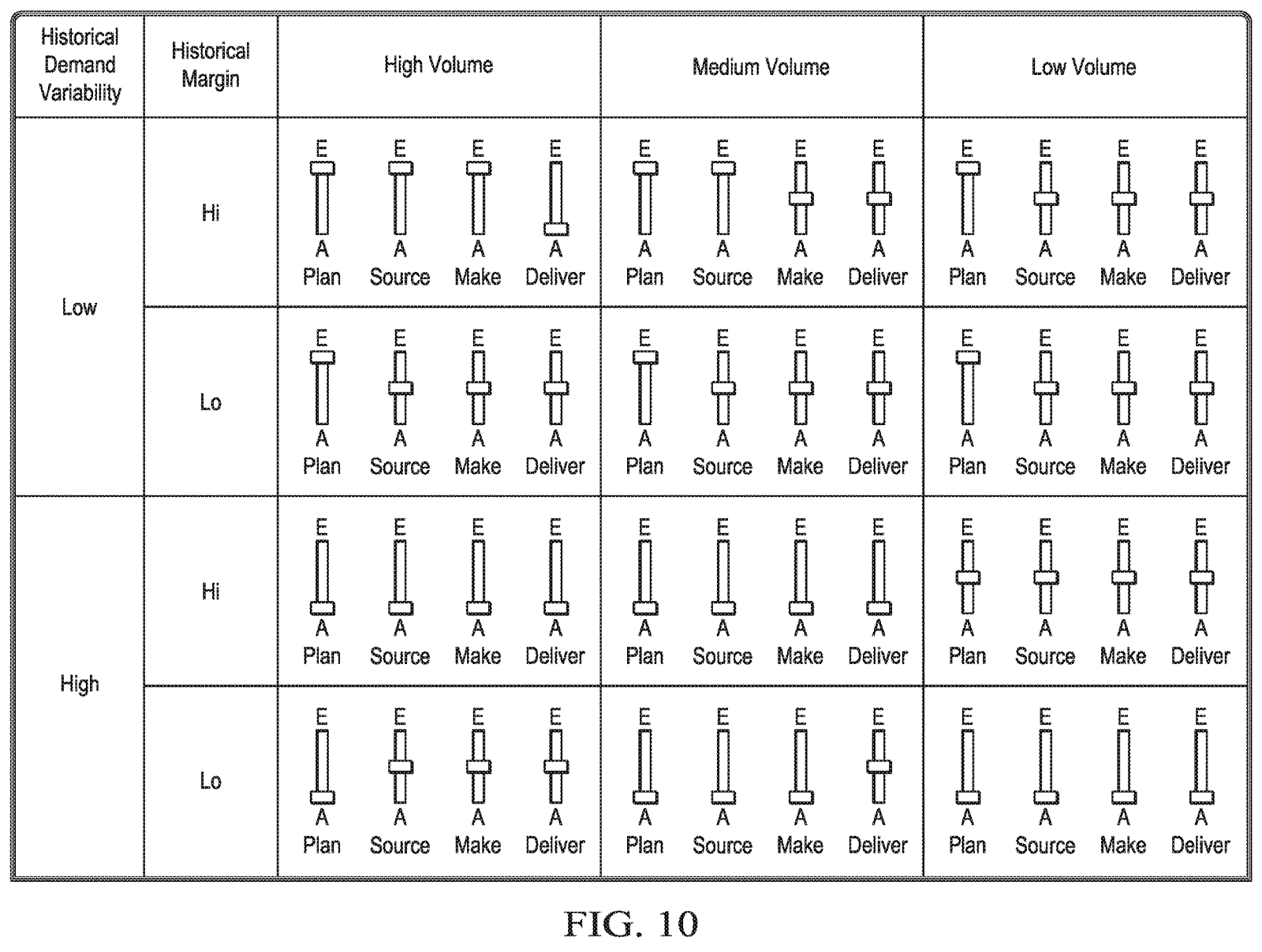

FIG. 10 illustrates using parameters 470 for particular historical demand variability, particular historical margin, and particular volume. FIG. 10 is an exemplary embodiment demonstrating that different parameters 470 may be used to effect different strategies 430 for different situations. In some embodiments, a user may adjust various parameters 470 based on various needs. Embodiments contemplate any number or combination of parameters 470 for any number or combination of dimensions 308 or segments 310 to be planned with segmentation planner 110.

Figure 11:
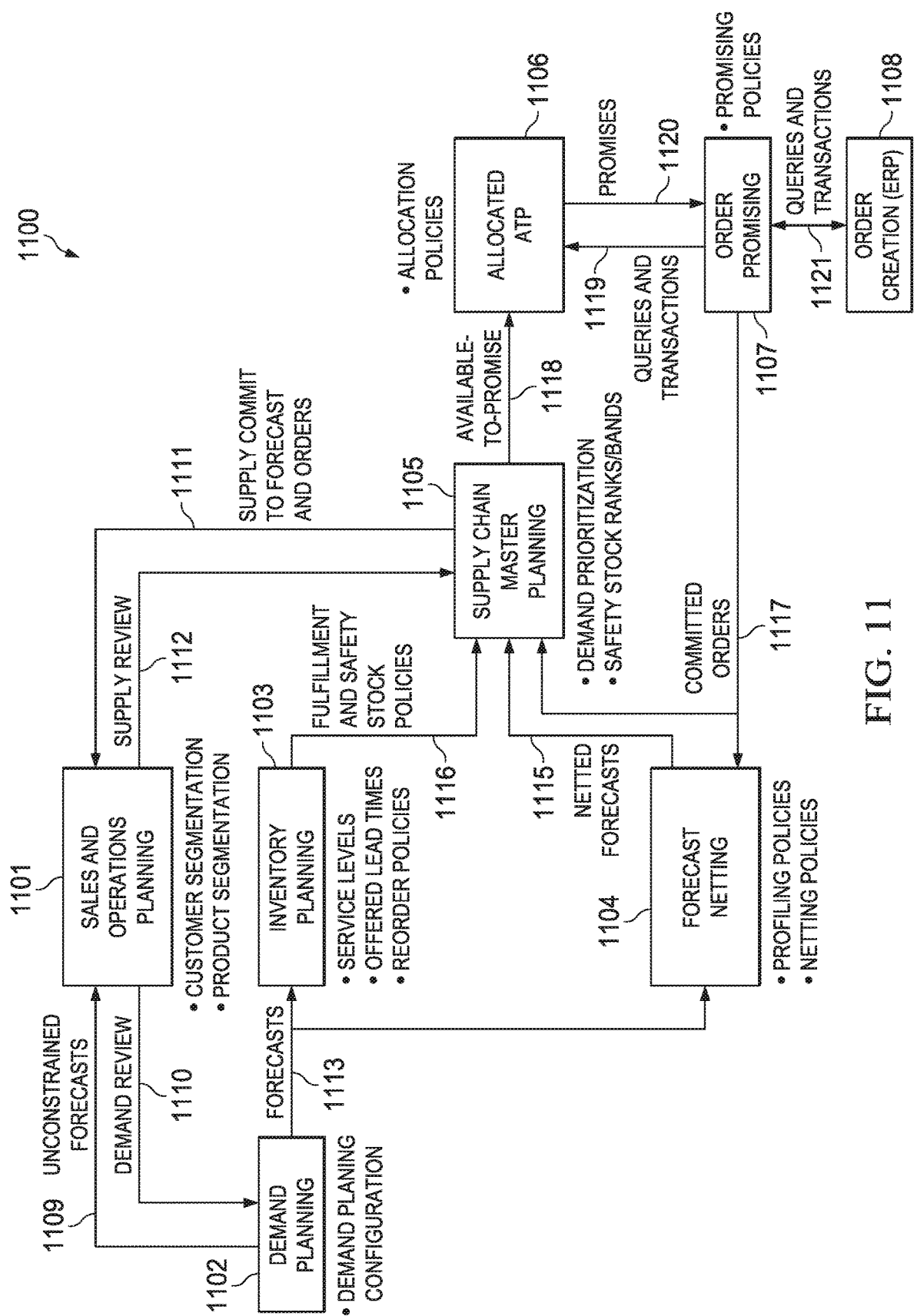
FIG. 11 illustrates a block diagram of customer and product segmentation in a supply chain according to an embodiment.

FIG. 11 illustrates a block diagram of customer and product segmentation integration into a supply chain system 1100. As discussed above, a supply chain may have one or more entities 120 such as customers, items, locations, channels, buyers. Each block 1101-1108 represents one or more computer systems or modules which are programmed to effectuate the listed operation. Any of the systems or modules can be operated on the same or different computers, according to particular needs. Segmentation planner 110 modifies rules, policies, constraints, and other types of data on the systems illustrated in FIG. 11 according to the following disclosure.

Order creation in supply chain system 1100 begins with Enterprise Resource Planner 1108, which sends and receives queries and transactions 1121 from order promising system 1107. Order promising system 1107 comprises policies for allocating orders among customers. Order promising system 1107 receives order promises 1120 from allocated Available-to-Promise (ATP) system 1106 and sends queries and transactions 1119 to allocated ATP system 1106. Order promising system 1107 sends committed orders 1117 to forecast netting system 1104 and supply chain master planning system 1105. Segmentation planner 110, in response to a user selection of a strategy 430, modifies the policies of order promising system 1107 to effectuate the selected strategy 430.

Forecast netting system 1104 receives forecasts 1113 from demand planning system 1102 and sends netted forecasts 1115 to supply chain master planning system 1105. Segmentation planner 110, in response to a selection of strategy 430, modifies profiling policies and netting policies of forecast netting system 1104 to effectuate the selected strategy 430.

Demand planning system 1102 sends forecasts 1113 to inventory planning system 1103, sends unconstrained forecasts 1109 to sales and operations planning system 1101, and receives demand review 1110 from sales and operations planning system 1101. Segmentation planner 110, in response to a selection of strategy 430, modifies a demand planning configuration of the demand planning system 1102 to effectuate the selected strategy 430.

Inventory planning system 1103 sends fulfillment and safety stock policies 1116 to supply chain master planning system 1105. Segmentation planner 110, in response to a selection of strategy 430, modifies service levels, offered lead times, and/or reorder policies of inventory planning system 1103 to effectuate the selected strategy 430.

Sales and operations planning system 1101 receives supply commit to forecast and orders 1111 from supply chain master planning system 1105 and sends supply review 1112 to supply chain master planning system 1105. Segmentation planner 110, in response to a selection of a strategy 430, modifies customer segmentation and product segmentation of sales and operation planning system 1101 to effectuate the selected strategy 430.

Supply chain master planning system 1105 sends ATP data 1118 to allocated ATP system 1106. Segmentation planner 110, in response to a selection of strategy 430, modifies demand prioritization and safety stock ranks and/or bands of supply chain master planning system 1105 to effectuate the selected strategy 430. Additionally, segmentation planner 110, in response to a selection of strategy 430, modifies allocation policies of allocated ATP system 1106 to effectuate the selected strategy 430.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of segmentation planning, comprising:
a computer system comprising a processor, a memory, and a database comprising one or more strategies associated with predefined tactics, the computer system:
defines a first dimension and a second dimension of one or more entities;
receives data from the one or more entities by a network connected with supply chain transaction systems associated with the one or more entities;
profiles the one or more entities according to one or more cost-to-serve intervals and one or more value intervals;
creates a multi-dimensional cube by segmenting the first dimension and the second dimension for the one or more entities based on the one or more cost-to-serve intervals and the one or more value intervals and one or more rules;
defines one or more micro-segments of the multi-dimensional cube;
assigns the one or more strategies to the one or more micro-segments based on the cost-to-serve interval and the value interval of entities associated with the one or more micro-segments;
implements the predefined tactics to achieve the one or more strategies assigned to the one or more micro-segments by updating the supply chain transaction systems;
monitors, autonomously without human intervention, data from the supply chain transaction systems indicating unplanned events and changed conditions and in response to the monitoring, a learning feedback loop refines the one or more micro-segments and updates the predefined tactics to achieve the one or more strategies; and
adjusts the implementing of the predefined tactics by further updating the supply chain transaction systems.

2. The system of claim 1, wherein the first dimension and the second dimension comprise one or more of:
demographic attributes, channel attributes, customer attributes, color, cost, geographical sector, lead time, price, product attributes, sales volume, service level, variability, and value.

3. The system of claim 1, wherein the computer implements the predefined tactics to achieve the one or more strategies assigned to the one or more micro-segments by:
assigning a predefined set of tactics to each of the one or more strategies corresponding to each of the one or more micro-segments;
assigning one or more supply chain parameters to the predefined set of tactics, wherein the one or more supply chain parameters comprise a posture for the predefined set of tactics; and
assigning one or more supply chain policies to the posture for the predefined set of tactics.

4. The system of claim 1, wherein the computer system further implements the predefined tactics by configuring one or more of the following supply chain parameters:
plan, source, make, deliver, price and assort.

5. The system of claim 3, wherein the computer system configures the one or more supply chain parameters according to relative positions of an agile setting, an efficient setting or a balanced setting.

6. The system of claim 3, wherein the computer system assigns one or more supply chain policies based on the one or more supply chain parameters, the one or more supply chain policies comprising one or more of:
service levels, postponement models, offered lead times, priorities for tiered budget, demand segment attributes, product segment attributes, supply segment attributes, capacity segment attributes, forecast horizon, forecast lag, model selection, distribution requirements plan duration, master planning schedule coverage duration, safety stock coverage, safety stock rule, replenishment quantities, ship quantities, forecast adjustment, proration, consumption, master planning priorities, order promising, promising polices, and allocation policies.

7. The system of claim 1, wherein the computer system displays one or more graphical user interfaces that graph at least one of the first dimension and the second dimension versus one or more value measurements or one or more cost-to-serve measurements.

8. A method of segmentation planning, comprising:
receiving, by a computer, one or more strategies stored in a database and associated with predefined tactics;

defining, by the computer, a first dimension and a second dimension for one or more entities;

receiving data from the one or more entities by a network connected with supply chain transaction systems associated with the one or more entities;

profiling, by the computer, the one or more entities according to one or more cost-to-serve intervals and one or more value intervals;

creating a multi-dimensional cube by segmenting, by the computer, the first dimension and the second dimension for the one or more entities based on the one or more cost-to-serve intervals and the one or more value intervals and one or more rules;

defining, by the computer, one or more micro-segments of the multi-dimensional cube;

assigning, by the computer, the one or more strategies to the one or more micro-segments based on the cost-to-serve interval and the value interval of entities associated with the one or more micro-segments;

implementing, by the computer, the predefined tactics to achieve the one or more strategies assigned to the one or more micro-segments by updating the supply chain transaction systems;

monitoring, autonomously without human intervention, data from the supply chain transaction systems indicating unplanned events and changed conditions and in response to the monitoring, a learning feedback loop refines the one or more micro-segments and updates the predefined tactics to achieve the one or more strategies; and adjusting, by the computer, the implementing of the predefined tactics by further updating the supply chain transaction systems.

9. The method of claim 8, wherein the first dimension and the second dimension comprise one or more of:

demographic attributes, channel attributes, customer attributes, color, cost, geographical sector, lead time, price, product attributes, sales volume, service level, variability, and value.

10. The method of claim 8, further comprising implementing, by the computer, the predefined tactics to achieve the one or more strategies assigned to the one or more micro-segments by:

assigning, by the computer, a predefined set of tactics to each of the one or more strategies corresponding to each of the one or more micro-segments;

assigning, by the computer, one or more supply chain parameters to the predefined set of tactics, wherein the one or more supply chain parameters comprise a posture for the predefined set of tactics; and assigning, by the computer, one or more supply chain policies to the posture for the predefined set of tactics.

11. The method of claim 8, further comprising implementing, by the computer, the predefined tactics by configuring one or more of the following supply chain parameters: plan, source, make, deliver, price and assort.

12. The method of claim 10, further comprising configuring, by the computer, the one or more supply chain parameters according to relative positions of an agile setting, an efficient setting or a balanced setting.

13. The method of claim 10, further comprising assigning, by the computer, one or more supply chain policies based on the one or more supply chain parameters, the one or more supply chain policies comprising one or more of:

service levels, postponement models, offered lead times, priorities for tiered budget, demand segment attributes, product segment attributes, supply segment attributes, capacity segment attributes, forecast horizon, forecast lag, model selection, distribution requirements plan duration, master planning schedule coverage duration, safety stock coverage, safety stock rule, replenishment quantities, ship quantities, forecast adjustment, proration, consumption, master planning priorities, order promising, promising polices, and allocation policies.

14. The method of claim 8, further comprising displaying, by the computer, one or more graphical user interfaces that graph at least one of the first dimension and the second dimension versus one or more value measurements or one or more cost-to-serve measurements.

15. A non-transitory computer-readable medium embodied with software for segmentation planning of one or more entities in a supply chain, the software when executed using one or more computers:

receives one or more strategies associated with predefined tactics;

defines a first dimension and a second dimension for the one or more entities;

receives data from the one or more entities by a network connected with supply chain transaction systems associated with the one or more entities;

profiles the one or more entities according to one or more cost-to-serve intervals and one or more value intervals;

creates a multi-dimensional cube by segmenting the first dimension and the second dimension for the one or more entities based on the one or more cost-to-serve intervals and the one or more value intervals and one or more rules;

defines one or more micro-segments of the multi-dimensional cube;

assigns the one or more strategies to the one or more micro-segments based on the cost-to-serve interval and the value interval of entities associated with the one or more micro-segments;

implements the predefined tactics to achieve the one or more strategies assigned to the one or more micro-segments by updating the supply chain transaction systems;

monitors, autonomously without human intervention, data from the supply chain transaction systems indicating unplanned events and changed conditions and in response to the monitoring, a learning feedback loop refines the one or more micro-segments and updates the predefined tactics to achieve the one or more strategies; and adjusts the implementing of the predefined tactics by further updating the supply chain transaction systems.

16. The non-transitory computer readable medium of claim 15, wherein the first dimension and the second dimension comprise one or more of:

demographic attributes, channel attributes, customer attributes, color, cost, geographical sector, lead time, price, product attributes, sales volume, service level, variability, and value.

17. The non-transitory computer readable medium of claim 15, wherein the software when executed by one or more computers further:

assigns a predefined set of tactics to each of the one or more strategies corresponding to each of the one or more micro-segments;

assigns one or more supply chain parameters to the predefined set of tactics, wherein the one or more supply chain parameters comprise a posture for the predefined set of tactics; and assigns one or more supply chain policies to the posture for the predefined set of tactics.

18. The non-transitory computer readable medium of claim 15, wherein the software when executed by one or more computers further implements the predefined tactics by configuring one or more of the following supply chain parameters:

plan, source, make, deliver, price and assort.

19. The non-transitory computer readable medium of claim 17, wherein the software when executed by one or more computers further configures the one or more supply chain parameters according to relative positions of an agile setting, an efficient setting or a balanced setting.

20. The non-transitory computer readable medium of claim 17, wherein the software when executed by one or more computers further assigns one or more supply chain policies based on the one or more supply chain parameters, the one or more supply chain policies comprising one or more of:

service levels, postponement models, offered lead times, priorities for tiered budget, demand segment attributes, product segment attributes, supply segment attributes, capacity segment attributes, forecast horizon, forecast lag, model selection, distribution requirements plan duration, master planning schedule coverage duration, safety stock coverage, safety stock rule, replenishment quantities, ship quantities, forecast adjustment, proration, consumption, master planning priorities, order promising, promising polices, and allocation policies.

* * * * *